United States Patent
Imura

(12)
(10) Patent No.: US 8,678,678 B2
(45) Date of Patent: Mar. 25, 2014

(54) ADAPTER AND CAMERA SYSTEM

(75) Inventor: Yoshio Imura, Kawasaki (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 13/548,952

(22) Filed: Jul. 13, 2012

(65) Prior Publication Data

US 2013/0022347 A1  Jan. 24, 2013

Related U.S. Application Data

(60) Provisional application No. 61/607,273, filed on Mar. 6, 2012.

(30) Foreign Application Priority Data

Jul. 22, 2011  (JP) ................................. 2011-160813

(51) Int. Cl.
   *G03B 17/00*   (2006.01)
   *G03B 17/56*   (2006.01)
   *G02B 7/02*    (2006.01)

(52) U.S. Cl.
   CPC ............ *G03B 17/561* (2013.01); *G03B 17/565* (2013.01); *G02B 7/02* (2013.01)
   USPC ......................................... 396/419; 396/530

(58) Field of Classification Search
   CPC ........ G03B 17/00; G03B 17/14; G03B 17/48; G03B 17/561; G03B 17/565; G03B 7/02; G03B 7/021
   USPC .......................................... 396/419, 428, 530
   See application file for complete search history.

(56) References Cited

U.S. PATENT DOCUMENTS

| 5,467,158 | A |   | 11/1995 | Murashima et al. |
|---|---|---|---|---|
| 5,594,517 | A |   | 1/1997 | Tsunefuji |
| 5,625,853 | A | * | 4/1997 | Ihara ............................. 396/419 |
| 6,791,770 | B2 | * | 9/2004 | Yamazaki et al. ............ 359/819 |

(Continued)

FOREIGN PATENT DOCUMENTS

| JP | A-63-191136 | 8/1988 |
|---|---|---|
| JP | A-02-034824 | 2/1990 |

(Continued)

OTHER PUBLICATIONS

Jun. 4, 2013 Office Action issued in Japanese Patent Application No. 2011-160813 (with translation).

(Continued)

*Primary Examiner* — WB Perkey
(74) *Attorney, Agent, or Firm* — Oliff, PLC

(57) ABSTRACT

An adapter includes a first housing member that includes a first mount portion to which a camera body can be attached and detached and a second mount portion to which an interchangeable lens can be attached and detached, a second housing member that is integrally formed with the first housing member and includes a screw-receiving part, which can be attached to and detached from a tripod, in a side opposite to the first housing member, a driven member, and an actuator of a drive system for driving the driven member. The screw-receiving part is arranged in the vicinity of a center of an end of the second housing member, and at least a portion of the actuator is arranged in the periphery of the screw-receiving part in the second housing member.

7 Claims, 18 Drawing Sheets

(56) References Cited

U.S. PATENT DOCUMENTS

| | | | |
|---|---|---|---|
| 6,885,817 B2 * | 4/2005 | Artonne et al. | 396/20 |
| 2005/0163494 A1 | 7/2005 | Fukumoto et al. | |
| 2005/0213959 A1 * | 9/2005 | Chiang | 396/428 |
| 2006/0038127 A1 | 2/2006 | Furukawa | |
| 2006/0250702 A1 | 11/2006 | Nishimoto | |
| 2013/0022347 A1 * | 1/2013 | Imura | 396/530 |

FOREIGN PATENT DOCUMENTS

| | | |
|---|---|---|
| JP | A-03-009313 | 1/1991 |
| JP | A-04-116631 | 4/1992 |
| JP | A-04-121720 | 4/1992 |
| JP | A-05-181188 | 7/1993 |
| JP | A-05-249356 | 9/1993 |
| JP | A-06-317737 | 11/1994 |
| JP | A-07-333674 | 12/1995 |
| JP | A-08-194249 | 7/1996 |
| JP | A-08-286109 | 11/1996 |
| JP | A-09-015722 | 1/1997 |
| JP | A-2002-014405 | 1/2002 |
| JP | A-2003-255426 | 9/2003 |
| JP | A-2004-264367 | 9/2004 |
| JP | A-2005-017375 | 1/2005 |
| JP | A-2006-059687 | 3/2006 |
| JP | A-2006-301291 | 11/2006 |
| JP | A-2007-193081 | 8/2007 |
| JP | A-2007-243928 | 9/2007 |
| JP | A-2011-099987 | 5/2011 |

OTHER PUBLICATIONS

Oct. 22, 2013 Notice of Allowance issued in Japanese Patent Application No. 2011-160813 (with translation).

* cited by examiner

ADAPTER AND CAMERA SYSTEM

CROSS-REFERENCE TO RELATED APPLICATION

This application is a non-provisional application claiming priority to and the benefit of U.S. provisional application No. 61/607,273, filed Mar. 6, 2012, and claims priority to Japanese Patent Application No. 2011-160813 filed on Jul. 22, 2011. The entire contents of which are incorporated herein by reference.

BACKGROUND

1. Field of the Invention

The present invention relates to an adapter which is interposed between a camera body and an interchangeable lens, and a camera system which uses the adapter.

2. Description of Related Art

A type of camera in which a lens can be attached to and detached from a camera body and an optimal lens is exchanged according to user preferences is known.

In this kind of camera, a lens mount included as an attachment and detachment mechanism is provided on the camera body and an interchangeable lens can be attached to and detached from the lens mount (for example, refer to Japanese Unexamined Patent Application Publication Nos. 4-116631 and 4-121720).

In recent years, cameras in which specifications between the existing camera and the lens mount are different from each other have been widely used. However, even when purchasing a camera having a new specification, there is a desire to use the lens of the existing specification. In this case, an adapter is used in order to use the lens of the existing specification.

A lens mount of camera body is mounted on one side of the adapter and an interchangeable lens is mounted on the other side thereof. That is, a mount (attaching portion) which is suitable for the lens mount of the new specification is provided on one side of the adapter and a mount (attaching portion) which is suitable for the interchangeable lens of the existing specification is provided on the other side.

SUMMARY

However, when an interchangeable lens having a long barrel length (or heavy weight) is mounted on the camera through the adapter and photographing is performed, a tripod may be used. Generally, a tripod-mounting portion (tripod screw hole) for mounting on a tripod is provided on a bottom portion of a camera body or an interchangeable lens having a long focal length. However, a tripod-mounting portion (tripod screw hole) is also provided on the adapter, and therefore, its convenience can be improved.

The object of aspects of the present invention is to provide an adapter and a camera system in which there is no inconvenience even when a tripod-mounting portion (tripod screw hole) is provided on the adapter.

An adapter according to a first aspect of the present invention includes: a first housing portion that comprises a first mount portion which a camera body can be attached to and detached from, and a second mount portion which is provided so as to be separated from the first mount portion and which an interchangeable lens can be attached to and detached from; a second housing portion that is integrally formed with the first housing portion; an adapter side mounting seat, which is arranged at the second housing portion and which can be attached to and detached from an installation base for photographing; wherein the adapter side mounting seat is arranged further on an inside than a lens side mounting seat which can be attached to and detached from the installation base for photographing in relation to a radial direction with an optical axis of the interchangeable lens as a center, the interchangeable lens mounted on the second mount portion comprises the lens side mounting seat.

A camera system according to a second aspect of the present invention includes: the adapter according to the first aspect of the present invention; a camera body that is mounted on the first mount portion; and an interchangeable lens that is mounted on the second mount portion.

According to aspects of the present invention, an adapter in which there is no inconvenience even when the tripod-mounting portion (tripod screw hole) is provided on the adapter can be provided.

DETAILED DESCRIPTION

Figure 1:
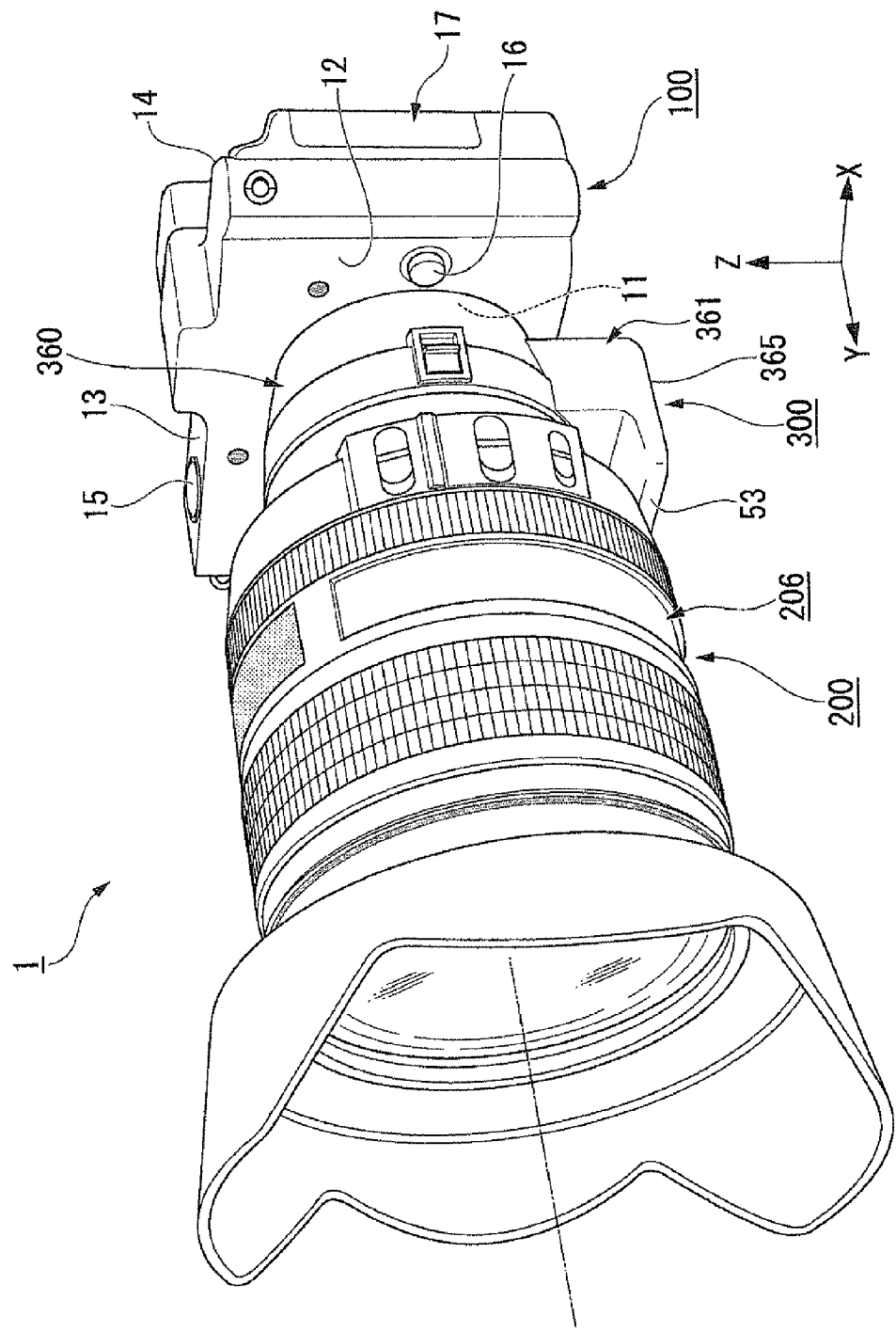
FIG. 1 is a perspective view showing a camera system of the present embodiment.

The present embodiment will be described. FIG. 1 is a perspective view showing a camera system of the present embodiment.

A camera system 1 shown in FIG. 1 includes a camera body 100, an interchangeable lens 200, and an adapter 300. The adapter 300 is mounted on the camera body 100. The interchangeable lens 200 is mounted on the adapter 300 on a side opposite to the camera body 100 with respect to the adapter 300.

The camera body 100 of the present embedment includes a body side mount 11. The body side mount 11 can mount an interchangeable lens which has a mount with suitable dimensions for the body side mount 11, or the like. The size of the mount of the interchangeable lens 200 of the present embodiment is different from that of the body side mount 11. Thereby, the interchangeable lens 200 cannot be directly mounted on the camera body 100. The interchangeable lens 200 can be indirectly mounted on the body side mount 11 through the adapter 300. That is, the adapter 300 includes a first adapter side mount (first mount portion; refer to reference numeral 31 of FIG. 2) as a mount with suitable dimensions for the body side mount 11 so as to be directly mounted on the camera body 100. Moreover, the adapter 300 includes a second adapter side mount 362 (second mount portion) so as to directly mount the interchangeable lens 200 (interchangeable lens side mount 21; refer to FIG. 2) on a side opposite the side to which the camera body 100 is mounted (to first adapter side mount 31).

The camera body 100 of the present embodiment includes a top surface 13 which is positioned on the upper portion in side surfaces facing the side with respect to a front surface on which the body side mount 11 is arranged, and a rear surface 14 which faces the side opposite to the front surface 12. In the camera body 100 of the present embodiment, accessories such as a flash device may be mounted on the top surface 13.

In the present embodiment, an XYZ rectangular coordinate system shown in FIG. 1 or the like is set, and a positional relationship of each portion or the like may be described. In the XYZ rectangular coordinate system, the Y-axis direction is a direction which is substantially parallel to an optical axis AX of the interchangeable lens 200. In the XYZ rectangular coordinate system, the X-axis direction and the Z-axis direction are respectively perpendicular to the Y-axis direction and are directions which are perpendicular to each other. The front surface 12 and the rear surface 14 are each substantially perpendicular to the Y-axis direction. The top surface 13 is substantially perpendicular to the Z-axis direction.

Figure 2:
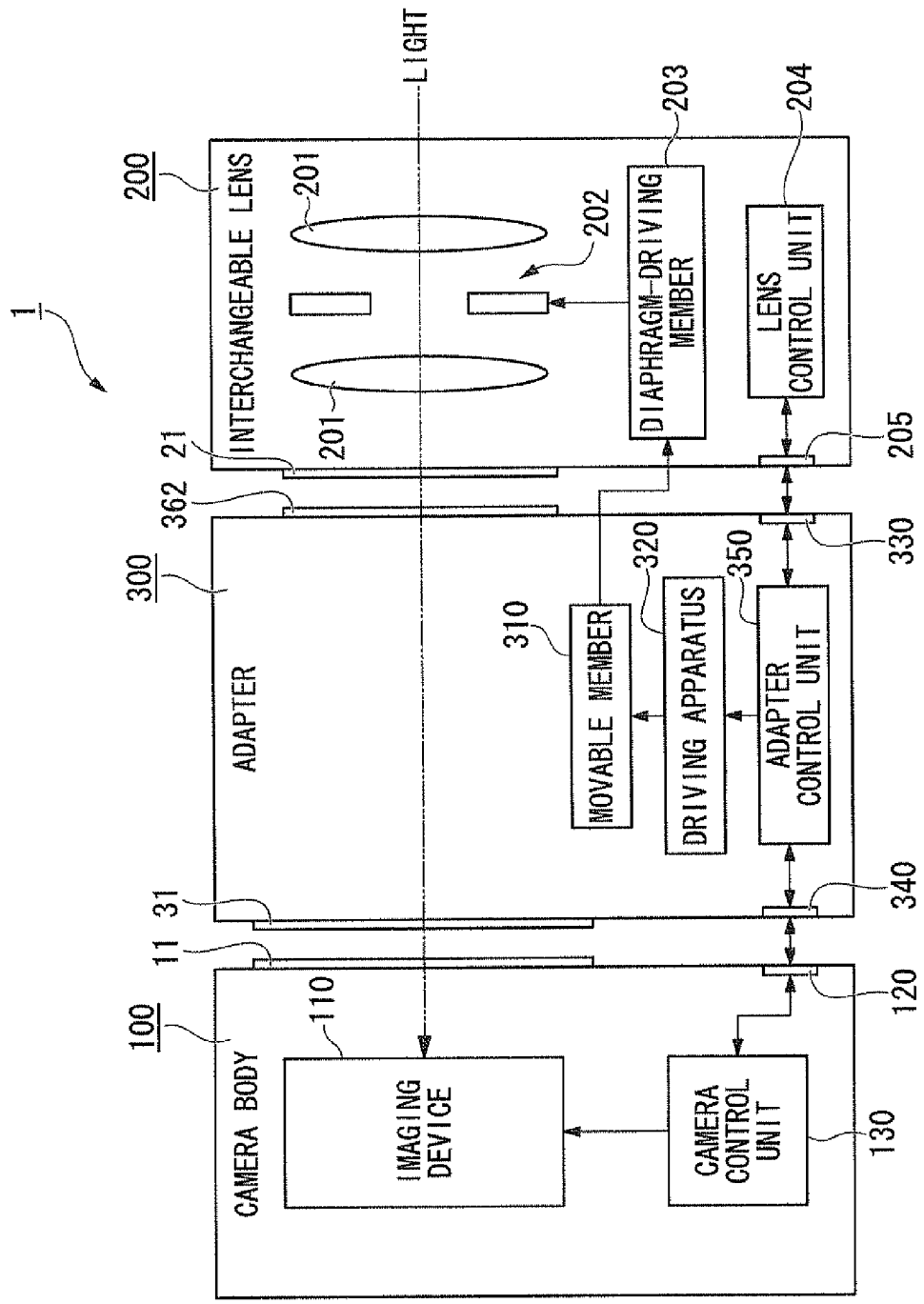
FIG. 2 is a view showing a functional configuration of the camera system of the present embodiment.

FIG. 2 is a view showing a functional configuration of the camera system of the present embodiment. As shown in FIG. 2, in the camera system 1, light entering the interchangeable lens 200 passes through the interchangeable lens 200 and the adapter 300 and enters an imaging device 110 of the camera body 100. The camera system 1 can capture an image, which is formed in the imaging device 110 of the camera body 100 by the interchangeable lens 200, by the camera body 100.

The interchangeable lens 200 of the present embodiment includes a plurality of lenses 201, a diaphragm unit 202 (aperture diaphragm), a diaphragm-driving member 203, a lens control unit 204, a first terminal portion 205, and a lens barrel 206(refer to FIG. 1). The plurality of lenses 201 refract the light entering the interchangeable lens 200 and form an image at a light-receiving surface of the imaging device 110 of the camera body 100. The diaphragm unit 202 changes the quantity of light, which enters the imaging device 110 through the plurality of lenses 201, using an aperture ratio. For example, the diaphragm-driving member 203 is a diaphragm lever which interlocks with the diaphragm unit 202. The aperture ratio of the diaphragm unit 202 is changed by displacement of the diaphragm-driving member 203. The camera system 1 can control an exposure value and a depth of field with respect to the imaging device 110 by controlling the aperture ratio of the diaphragm unit 202. The lens barrel 206 houses and protects the plurality of lenses 201, the diaphragm unit 202, and the lens control unit 204. The first terminal portion 205 is mounted on the lens barrel 206. The first terminal portion 205 is connected to the lens control unit 204. The first terminal portion 205 is connected to a second terminal portion 330 of the adapter 300 in a state where the interchangeable lens 200 is mounted on the adapter 300 (hereinafter, referred to as a mounted state of the interchangeable lens 200). The lens control unit 204 of the present embodiment controls the positions of the plurality of lenses 201 in the direction which is substantially parallel to the optical axis AX, and performs a focusing control controlling focal positions of the plurality of lenses 201, a zoom control controlling a zoom magnification, and the like.

The adapter 300 of the present embodiment includes a movable member 310 (driven member), a driving apparatus 320 (drive system), the second terminal portion 330, a third terminal portion 340, and an adapter control unit 350. The movable member 310 is driven by the driving apparatus 320, and therefore, displaces the diaphragm-driving member 203 of the interchangeable lens 200. Each of the second terminal portion 330 and the third terminal portion 340 is connected to the adapter control unit 350. The second terminal portion 330 is connected to the first terminal portion 205 of the interchangeable lens 200 in the mounted state of the interchangeable lens 200. The third terminal portion 340 is connected to a fourth terminal portion 120 of the camera body 100 in a state where the adapter 300 is mounted on the camera body 100 (hereinafter, referred to as a "mounted state of the adapter 300"). The adapter 300 will be described in detail below.

As shown in FIG. 1, the camera body 100 of the present embodiment includes a release button 15, a first attaching and detaching switch 16, and a housing 17. Moreover, as shown in FIG. 2, the camera body 100 includes an imaging device 110, the fourth terminal portion 120, and a camera control unit 130.

The release button 15 of the present embodiment is arranged on the top surface 13. The camera body 100 detects that the release button 15 is operated (half-pressed or fully-pressed) and performs various processes such as imaging processing.

The first attaching and detaching switch 16 of the present embodiment is arranged on the front surface 12. By operating the first attaching and detaching switch 16, the interchangeable lens 200 or the adapter 300 which is mounted on the body side mount 11 can be removed from the body side mount 11. The first attaching and detaching switch 16 interlocks with a pin which is arranged in the body side mount 11. The pin regulates a relative position between the camera body 100 and the adapter 300 in a circumferential direction with the optical axis AX as a center in the mounted state of the adapter 300. That is in the mounted state of the adapter 300, the pin regulates the relative position so that the adapter 300 does not rotate with respect to the camera body 100 in the circumferential direction with the optical axis AX as the center.

The housing 17 of the present embodiment houses and protects the imaging device 110 and the camera control unit 130. The fourth terminal portion 120 is provided in the housing 17. The fourth terminal portion 120 is connected to the third terminal portion 340 of the adapter 300 in the mounted state of the adapter 300. The camera body 100 of the present embodiment includes a battery (not shown) which supplies power to each portion in the camera body 100.

The imaging device 110 of the present embodiment includes a plurality of pixels which are arranged two-dimensionally. Each pixel of the imaging device 110 includes a light-receiving element such as a CCD (Charge Coupled device) sensor or a CMOS (Complementary Metal Oxide Semiconductor) sensor. The light-receiving element of the imaging device 110 generates an electric charge according to the quantity of light which enters each pixel from the interchangeable lens 200. The imaging device 110 converts the electric charge, which is generated in the light-receiving element by the light entering each pixel, into a signal. The imaging device 110 generates an image signal indicating an image of a subject which is formed on a light-receiving surface of the imaging device 110 through the interchangeable lens 200.

The camera control unit 130 of the present embodiment detects an operation which indicates that the release button 15 has been operated (half-pressed or fully-pressed). The camera control unit 130 controls the imaging device 110 based on the detected operation and performs imaging processing. Moreover, the camera control unit 130 performs the process, which is necessary for performing imaging processing, in the interchangeable lens 200 through the adapter 300.

In the present embodiment, the camera control unit 130 outputs a control signal which controls the adapter control unit 350 and a signal which indicates information necessary for imaging to the adapter control unit 350 through the fourth terminal portion 120 and the third terminal portion 340. The adapter control unit 350 outputs a control signal which controls the lens control unit 204 and a signal which indicates information necessary for the imaging to the lens control unit 204 through the second terminal portion 330 and the first terminal portion 205. The lens control unit 204 outputs a signal which indicates information necessary for the imaging to the adapter control unit 350 through the first terminal portion 205 and the second terminal portion 330. The camera body 100 of the present embodiment includes a battery (not shown) which supplies power to each portion of the camera system 1. The camera body 100 supplies power to each portion in the adapter 300 through the fourth terminal portion 120 and the third terminal portion 340. Moreover, the adapter 300 supplies the power, which is supplied from the camera body 100, to each portion in the interchangeable lens 200 through the second terminal portion 330 and the first terminal portion 205. Each of the first terminal portion 205, the second terminal portion 330, the third terminal portion 340, and the fourth terminal portion 120 includes a signal terminal in which a signal is input and output, a power supply terminal to which power is supplied, and a ground terminal which forms a pair with the power supply terminal.

Figure 3:
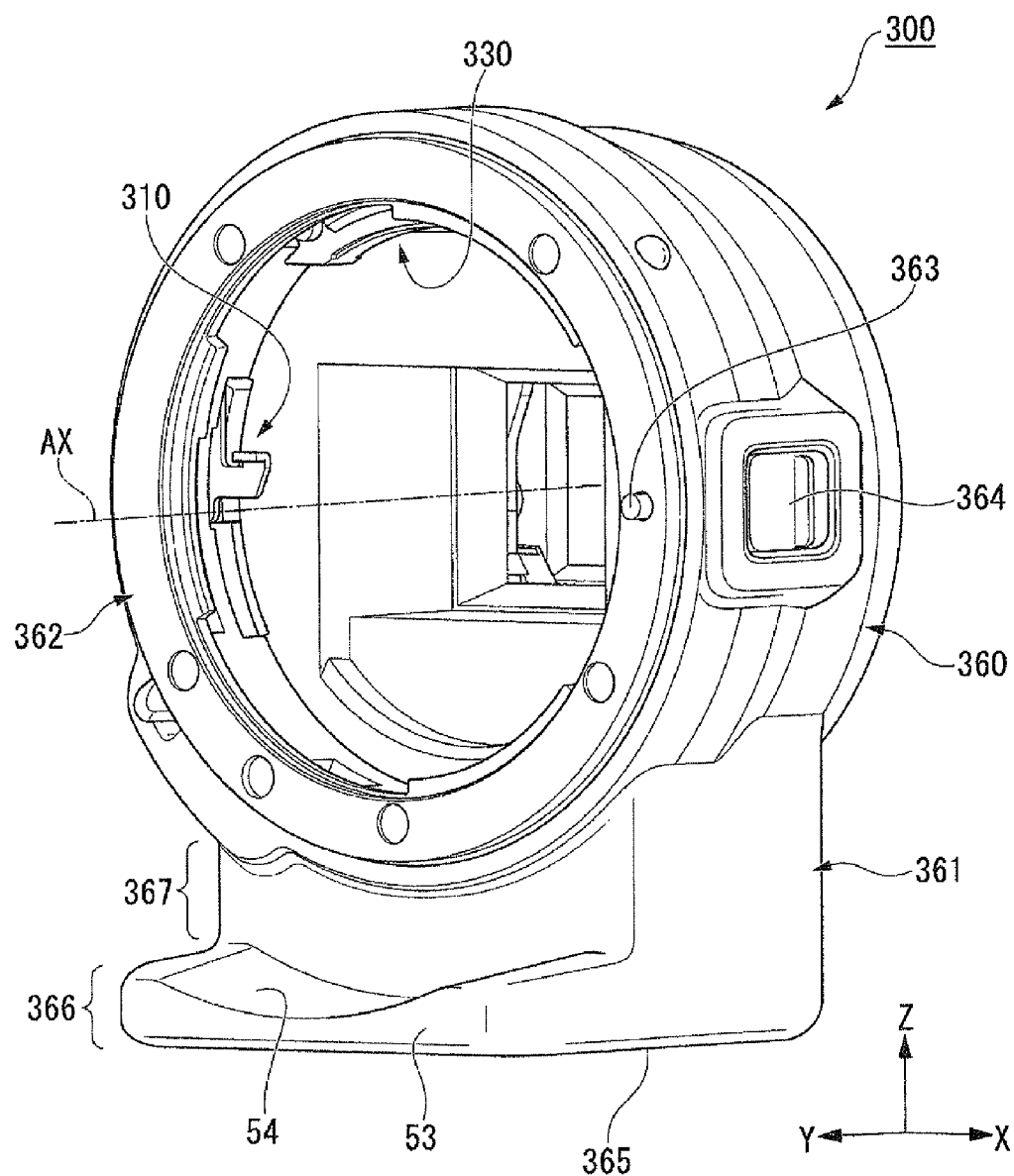
FIG. 3 is a perspective view showing an adapter of the present embodiment.
Figure 4:
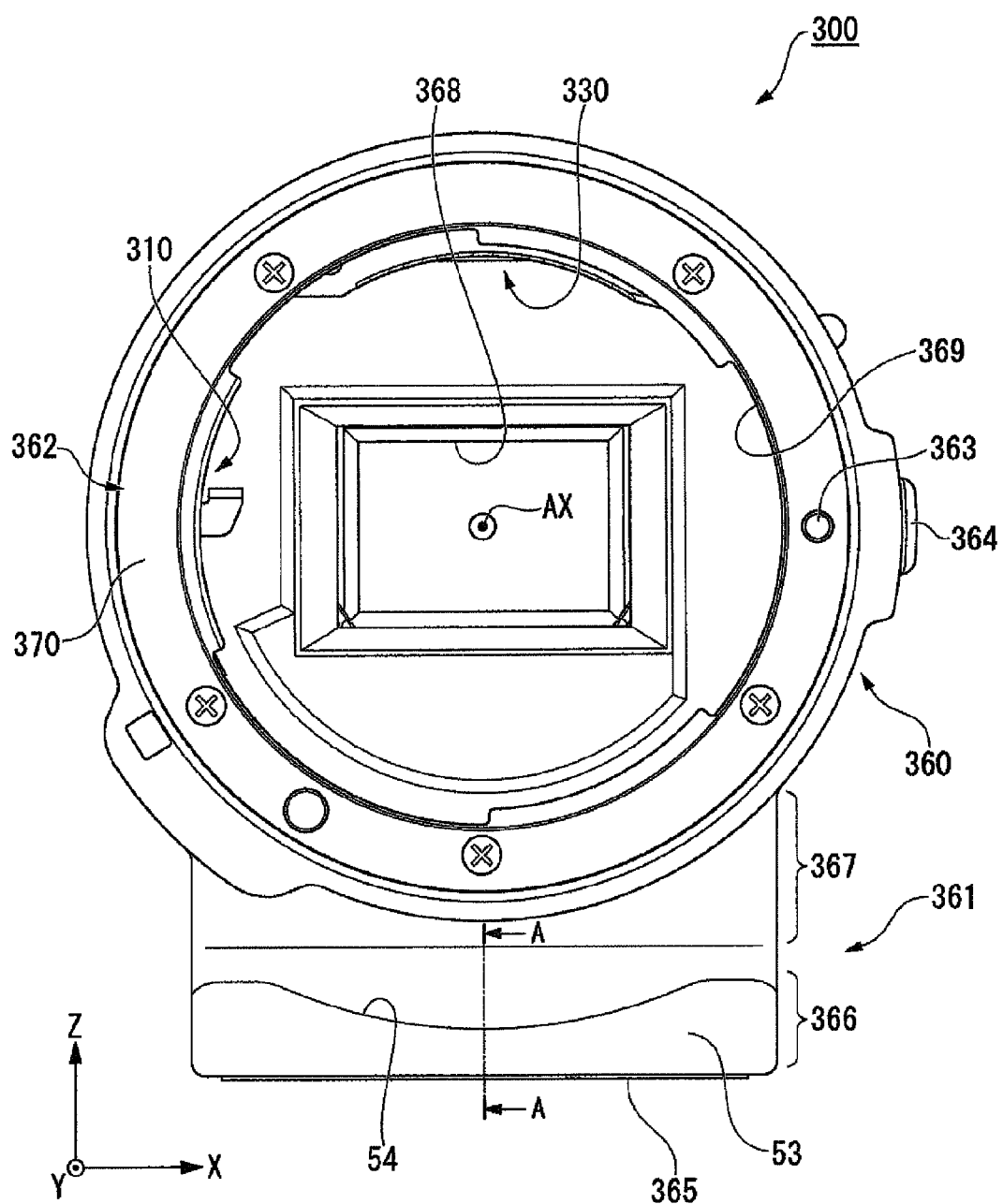
FIG. 4 is a front view showing the adapter of the present embodiment.

Next, the adapter 300 will be described in detail. FIG. 3 is a perspective view showing the adapter of the present embodiment. FIG. 4 is a plan view showing the adapter of the present embodiment.

The adapter 300 of the present embodiment includes a first housing member (first housing portion) 360, a second housing member (second housing portion) 361, a first adapter side mount 31 (see FIG. 2), a second adapter side mount 362, a pin 363, and a second attaching and detaching switch 364.

The second housing member (second housing portion) 361 of the present embodiment houses at least a portion of the driving apparatus 320 shown in FIG. 2. The second housing member 361 of the present embodiment is approximately box shaped. The second housing member 361 includes a surface (hereinafter, referred to as a "bottom surface 365") which faces the direction (−Z direction) crossing the optical axis AX of the interchangeable lens 200 in the mounted state of the interchangeable lens 200. The bottom surface 365 includes a screw hole or the like which can fix the adapter 300 to a tripod or the like. The second housing member 361 is joined with the first housing member 360 at a surface which faces the side opposite to the bottom surface 365 (+Z direction).

A bottom portion 366 including the bottom surface 365 protrudes toward an outer portion of the adapter 300 with respect to a ceiling portion 367 which includes the surface joined with the first housing member 360. The bottom portion 366 is arranged so as to further protrude toward the interchangeable lens 200 than the ceiling portion 367 in the mounted state of the interchangeable lens 200.

The first housing member (first housing portion) 360 of the present embodiment houses the movable member 310, the second terminal portion 330, the third terminal portion 340, and the adapter control unit 350. The first housing member 360 is supported by the second housing member 361 in a state where the bottom surface 365 of the second housing member 361 is supported by a tripod, a desk, or the like.

The first housing member 360 of the present embodiment is cylindrical. The axial direction of the first housing member 360 is substantially parallel to the optical axis AX of the interchangeable lens 200 in the mounted state of the interchangeable lens 200. The first housing member 360 includes a first opening portion 368 and a second opening portion 369. The first opening portion 368 is arranged in a direction which faces the camera body 100 (−Y direction) in the mounted state of the adapter 300. The second opening portion 369 is arranged in a direction which faces the interchangeable lens 200 (+Y direction) in the mounted state of the interchangeable lens 200. After the light entering the adapter 300 from the interchangeable lens 200 passes through the second opening portion 369, the light passes through the first opening portion 368 and enters the camera body 100.

The second adapter side mount 362 of the present embodiment is mounted on the first housing member 360. The second adapter side mount 362 is arranged on the surface facing the side opposite to the camera body 100 (+Y direction) in the mounted state of the adapter 300. The second adapter side mount 362 of the present embodiment is annular. The second adapter side mount 362 includes a mount surface 370 which contacts the interchangeable lens 200. At least a portion of the second adapter side mount 370 is a flat surface. The second adapter side mount 362 is arranged so that the optical axis AX of the interchangeable lens 200 passes through a center of the second adapter side mount 362 in the mounted state of the interchangeable lens 200.

The second terminal portion 330 of the present embodiment is arranged in the vicinity of an inner circumference of the second opening portion 369. A portion of the second terminal portion 330 protrudes to the inside of the inner circumference of the second opening portion 369. The second terminal portion 330 is arranged so that the second opening portion 369 is inserted between the second terminal portion 330 and the second housing member 361. In the present embodiment, in the position of the circumferential direction (rotation position) with the optical axis AX as the center, the position of the second terminal portion 330 may be expressed based on a reference angle) (0°). In the angle, a clockwise direction when viewed from one side in the optical axis direction (when viewed in −Y direction) is set to plus and a counterclockwise direction is set to minus.

The pin 363 and the second attaching and detaching switch 364 of the present embodiment are arranged at a rotation position substantially 90° from the second terminal portion 330 in the circumferential direction with the optical axis AX as the center. The pin 363 can advance and retreat in a normal direction (Y axis direction) of the mount surface 370. For example, the pin 363 can advance and retreat between a first position which protrudes from the mount surface 370 and a second position which does not protrude from the mount surface 370. The pin 363 can be advanced and retreated by operation of the second attaching and detaching switch 364.

When the pin 363 of the present embodiment is arranged at the first position in the mounted state of the interchangeable lens 200, the pin is inserted into a hole portion (not shown) which is provided in the interchangeable lens 200. In a state where the pin 363 is inserted into the hole portion which is provided in the interchangeable lens 200, the relative position of the interchangeable lens 200 with respect to the adapter 300 is regulated in the circumferential direction with the optical axis of the interchangeable lens 200 as the center. That is, the pin 363 prevents the interchangeable lens 200 from being rotated with respect to the adapter 300 in the circumferential direction with the optical axis of the interchangeable lens 200 as the center. When the pin 363 is arranged at the second position in the mounted state of the interchangeable lens 200, the pin 363 is not inserted into the hole portion which is provided in the interchangeable lens 200. Therefore, when the pin 363 is arranged at the second position, the interchangeable lens 200 can be removed from the second adapter side mount 362 by the operation of the second attaching and detaching switch 364.

Figure 5:
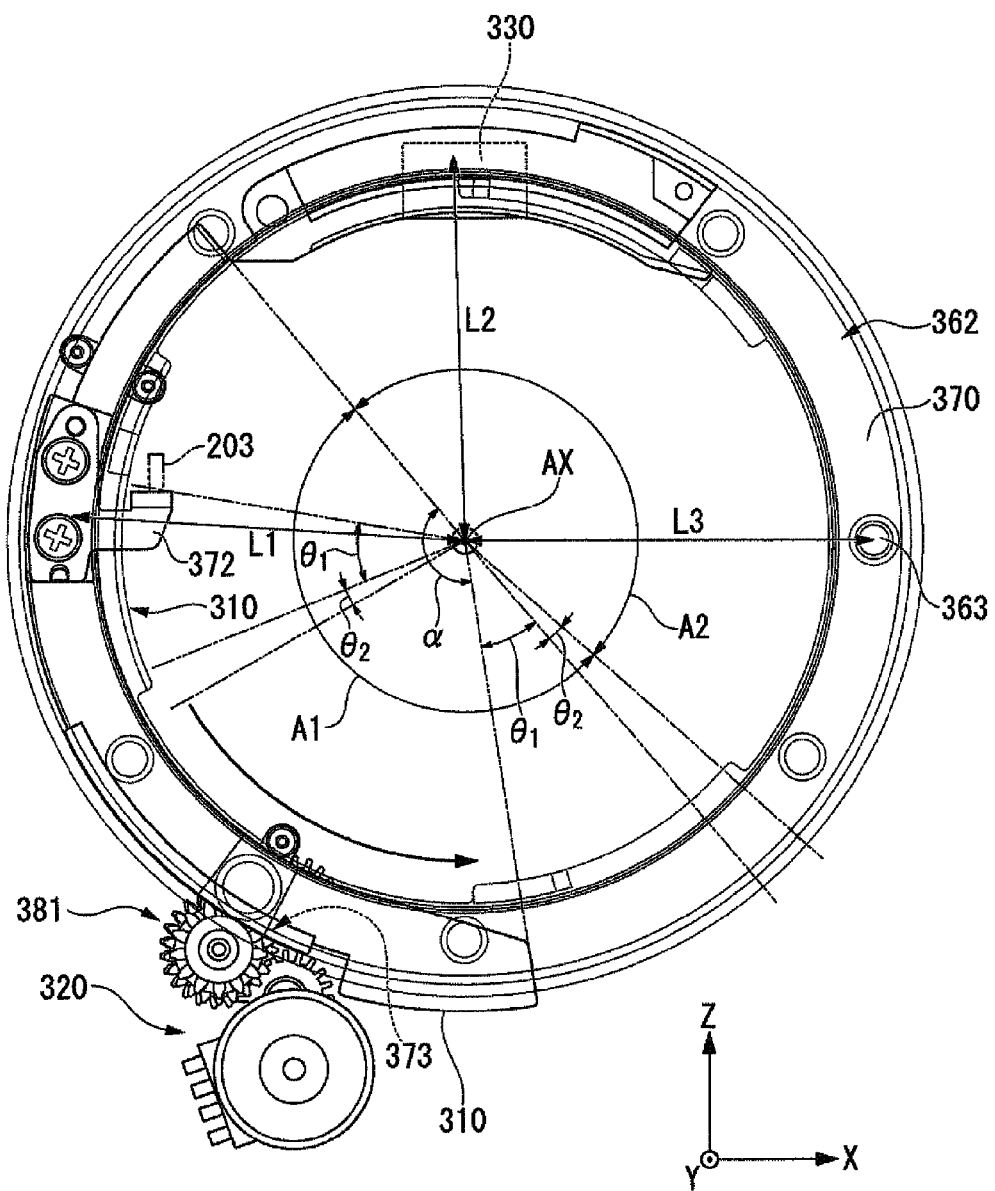
FIG. 5 is a front view showing a second adapter side mount, a movable member, and a driving apparatus of the present embodiment.

FIG. 5 is a plan view showing the second adapter side mount 362, the movable member 310, and the driving apparatus 320 of the present embodiment. The movable member 310 and the driving apparatus 320 of the present embodiment are arranged in a range which overlaps with the second adapter side mount 362 when viewed from the optical axis direction (Y-axis direction). The movable member 310 and the driving apparatus 320 are arranged at the side opposite to the interchangeable lens 200 (−Y direction) with respect to the second adapter side mount 362. In FIG. 5, the movable member 310 and the driving apparatus 320 are schematically shown through the second adapter side mount 362 or the like.

The movable member 310 of the present embodiment has approximately the same shape (crescent shape or arc shape) as a portion which occupies a predetermined angle range $\alpha[°]$ in the circumferential direction with the optical axis AX as the center in a ring with the optical axis AX as the center. In the present embodiment, the angle range $\alpha[°]$ is about 150°. For example, the angle range $\alpha[°]$ may be 180° or less, 120° or less, or 90° or less. From the state shown in FIG. 5, the movable member 310 is provided so as to rotatable only at an angle $(\theta1+\theta2)$ [°] counterclockwise in the circumferential direction with the optical axis AX as the center.

The driving apparatus 320 of the present embodiment is provided in a range which spans an inner area than the inner circumference of the second adapter side mount 362 and an outer region further to the outside than the outer circumference of the second adapter side mount 362 when viewed from the optical axis direction (Y-axis direction). The driving apparatus 320 of the present embodiment is arranged at an angle position of about −150°. The driving apparatus 320 rotates the movable member 310 through a predetermined angle range in the circumferential direction with the optical axis AX as the center. In a first state in which the movable member 310 is rotated up to a position which can move most in a counterclockwise direction and a second state (maximum opening position described below) in which the movable member 310 is rotated up to a position which can move most in a clockwise direction, a rotation position of an end of the movable member 310 is changed only by the angle $(\theta1+\theta2)$ [°] in the circumferential direction with the optical axis AX as the center. That is, a first range A1 in which the movable member 310 can rotate is an interval corresponding to an angle range $(\alpha+\theta1+\theta2)$ [°] of the circumferential direction with the optical axis AX as the center in a ring with the optical axis AX as the center. In addition, the state of the movable member 310 described in FIG. 5 is the second state.

In the present embodiment, in relation to a radial direction (radial direction of the second adapter side mount 362) with the optical axis AX as the center, a distance L1 between the movable member 310 and the optical axis AX is substantially the same as a distance L2 between the second terminal portion 330 and the optical axis AX. That is, in relation to the radial direction with the optical axis AX as the center, the distance between a portion of the movable member 310 and the optical axis AX is substantially the same as the distance between a portion of the second terminal portion 330 and the optical axis AX. In a state where the movable member 310 is closest to the second terminal portion 330 (second state), the second terminal portion 330 is set so that the movable member 310 does not overlap with the terminal of the second terminal portion 330 when viewed from the optical axis direction (Y-axis direction). That is, the second terminal portion 330 is arranged in a second range A2 except for the first range A1, in which the movable member 310 can rotate, in the circumferential direction with the optical axis AX with a center.

In the present embodiment, in relation to the radial direction with the optical axis AX as the center, the distance L1 between the movable member 310 and the optical axis AX is substantially the same as a distance L3 between the pin 363 and the optical axis AX. That is, in relation to the radial direction with the optical axis AX as the center, the distance between a portion of the movable member 310 and the optical axis AX is the same as the distance between a portion of the pin 363 and the optical axis AX. In the circumferential direction with the optical axis AX as the center, the pin 363 is arranged in the second range A2 except for the first range A1 in which the movable member 310 can rotate.

Figure 6:
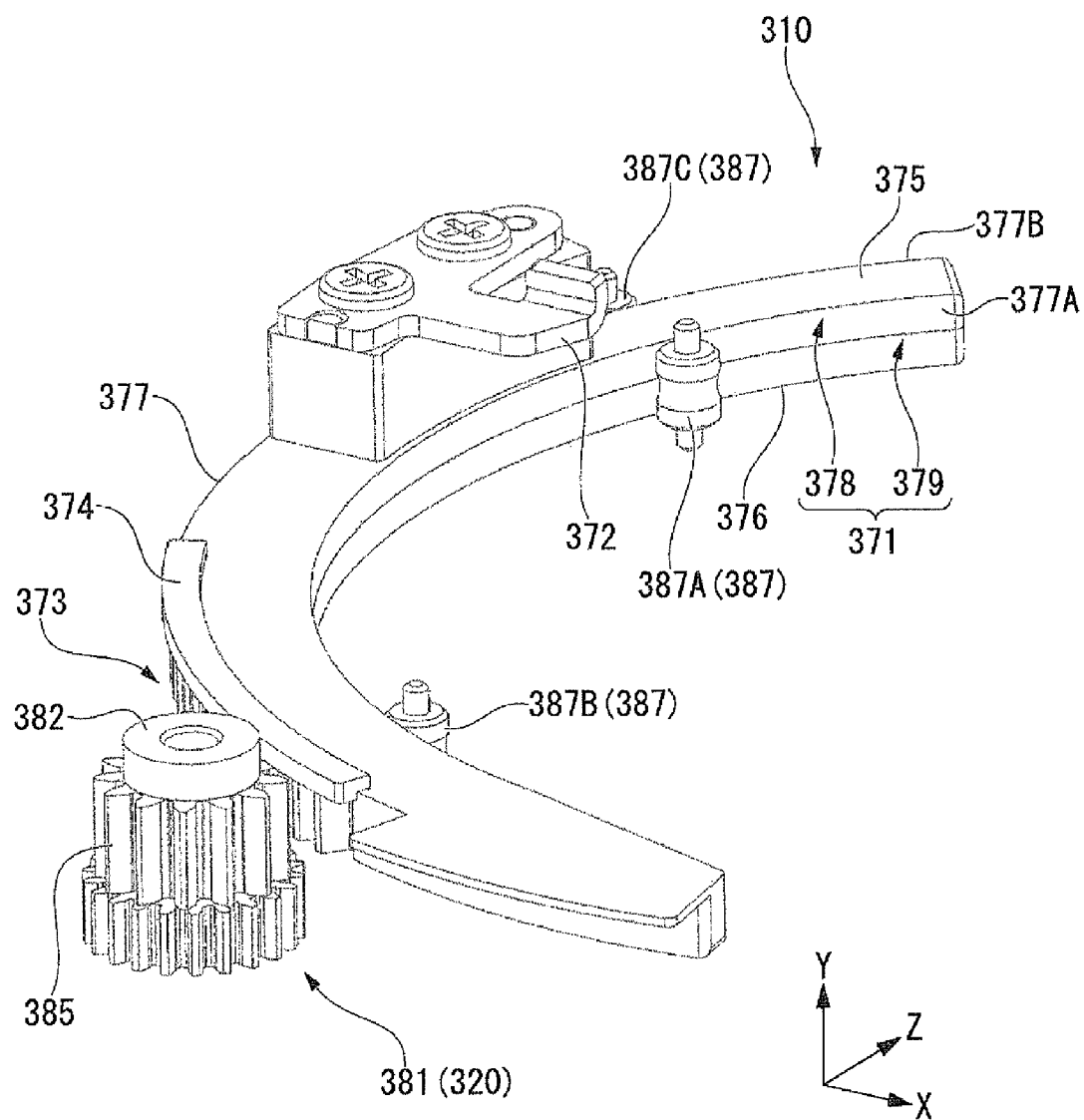
FIG. 6 is a perspective view showing the movable member and the driving apparatus of the present embodiment.
Figure 7:
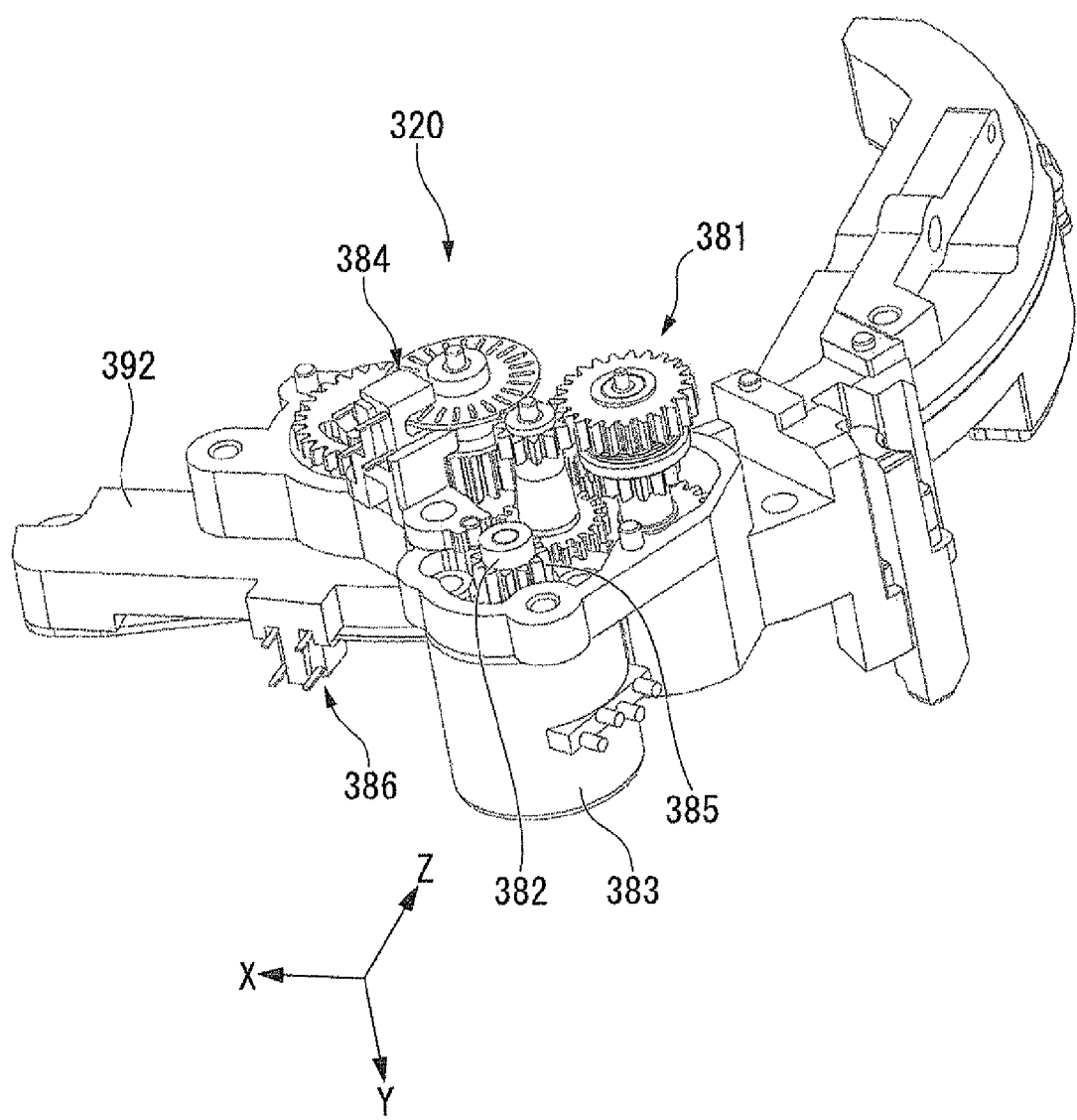
FIG. 7 is a perspective view showing the driving apparatus of the present embodiment.
Figure 8:
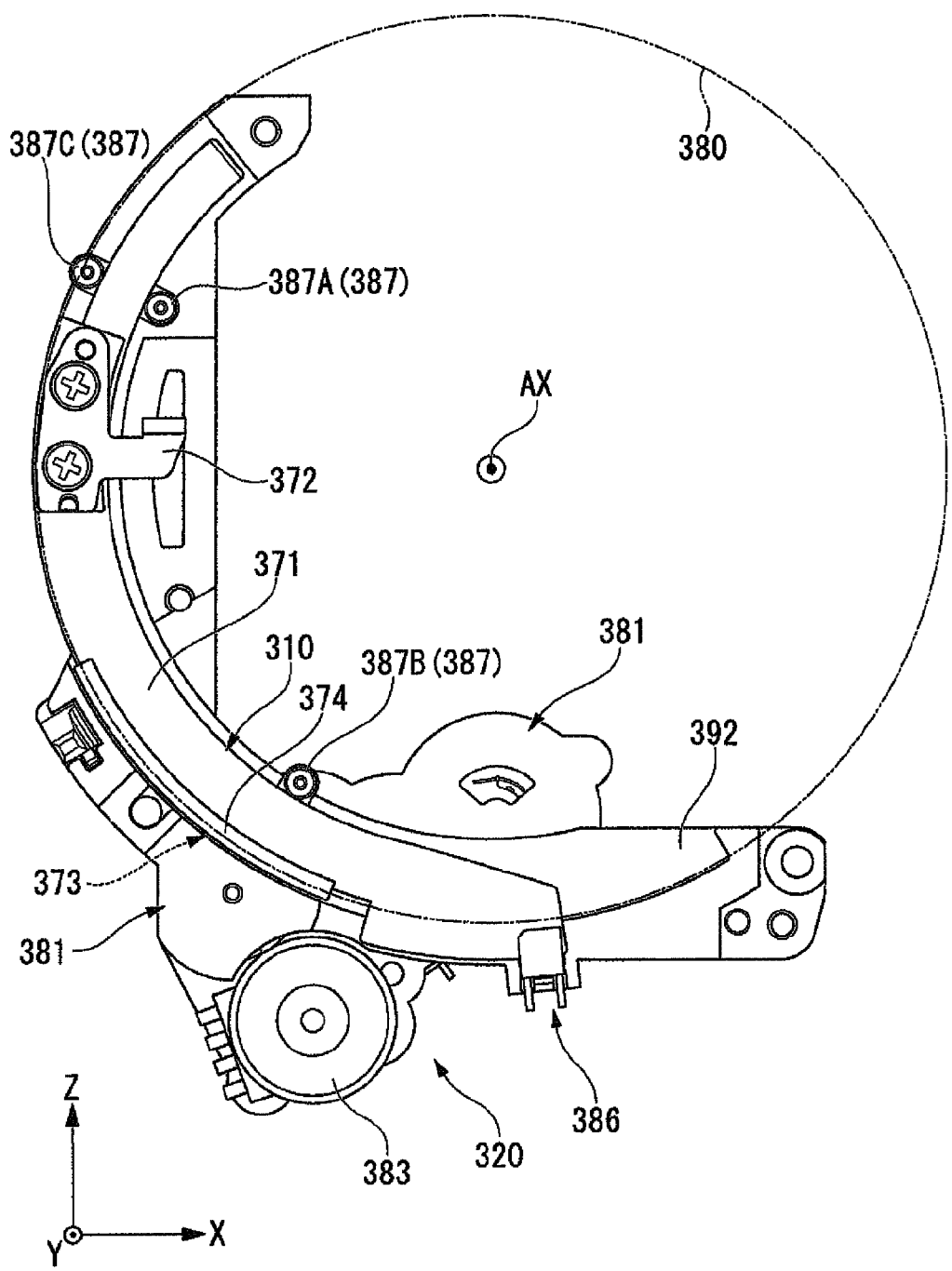
FIG. 8 is a front view showing the movable member and the driving apparatus of the present embodiment.
Figure 9:
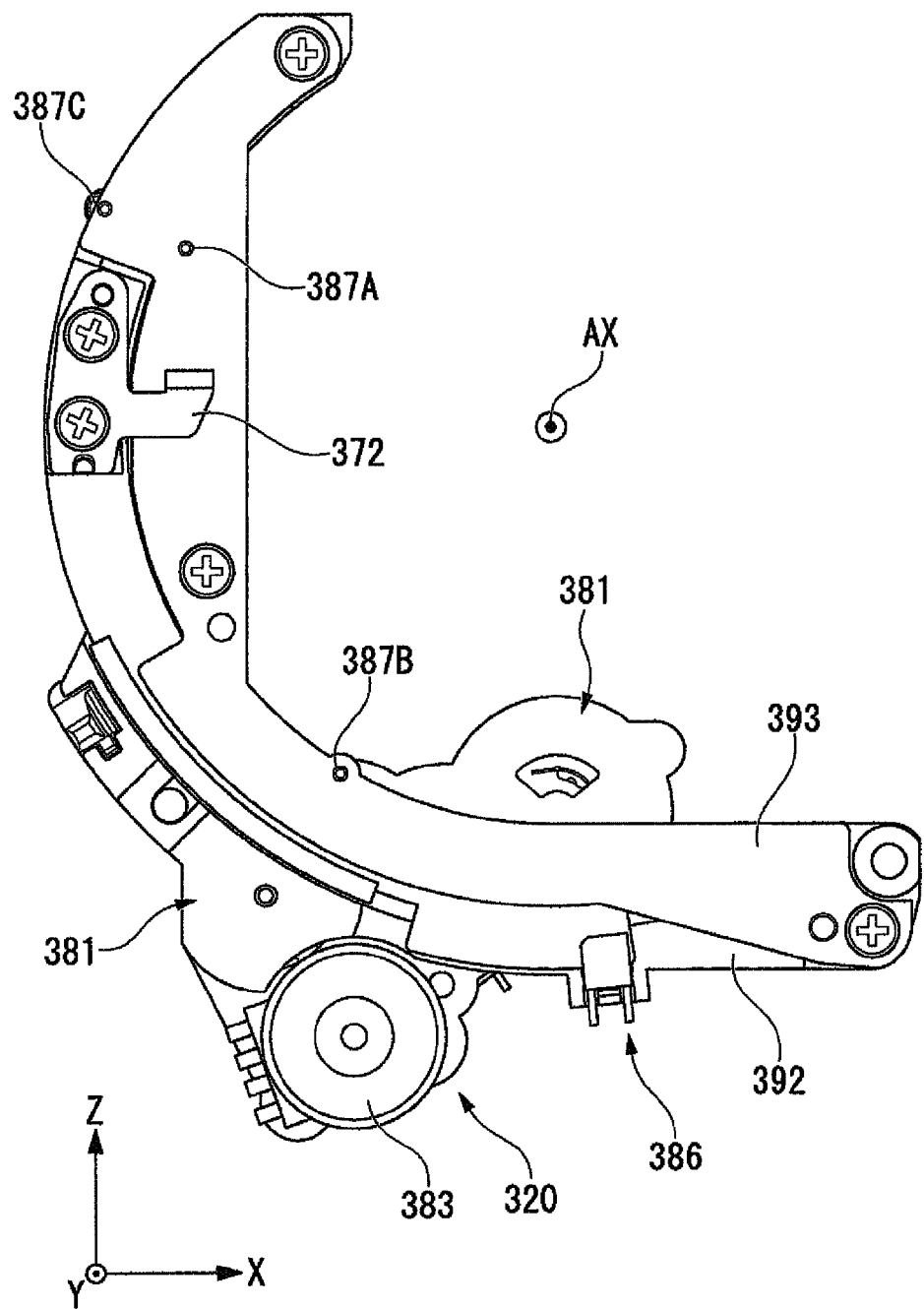
FIG. 9 is a front view showing the movable member, the driving apparatus, and a pressing plate of the present embodiment.
Figure 10:
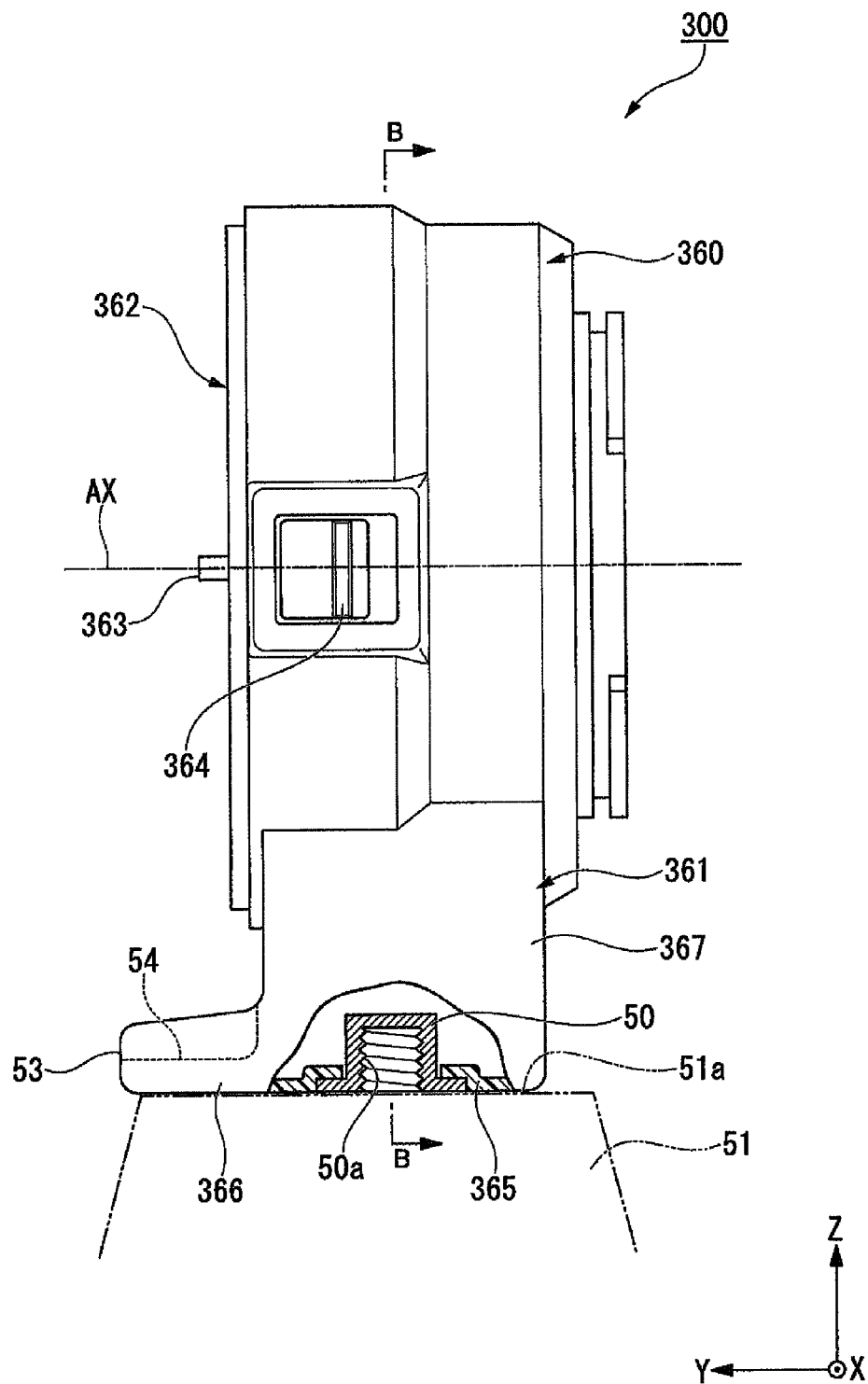
FIG. 10 is a side view in which a portion of the adapter of the present embodiment is broken along a cross-sectional portion A-A of FIG. 4.

FIG. 6 is a perspective view showing the movable member 310 and the driving apparatus 320 of the present embodiment. FIG. 7 is a perspective view showing the driving apparatus 320 of the present embodiment. FIG. 8 is a plan view showing the movable member 310 and the driving apparatus 320 of the present embodiment. FIG. 9 is a front view showing the movable member 310, the drive unit 320, and a pressing plate 393 of the present embodiment. FIG. 10 is a side view in which a portion of the adapter 300 of the present embodiment is broken at a cross-sectional portion A-A of FIG. 4.

Figure 11:
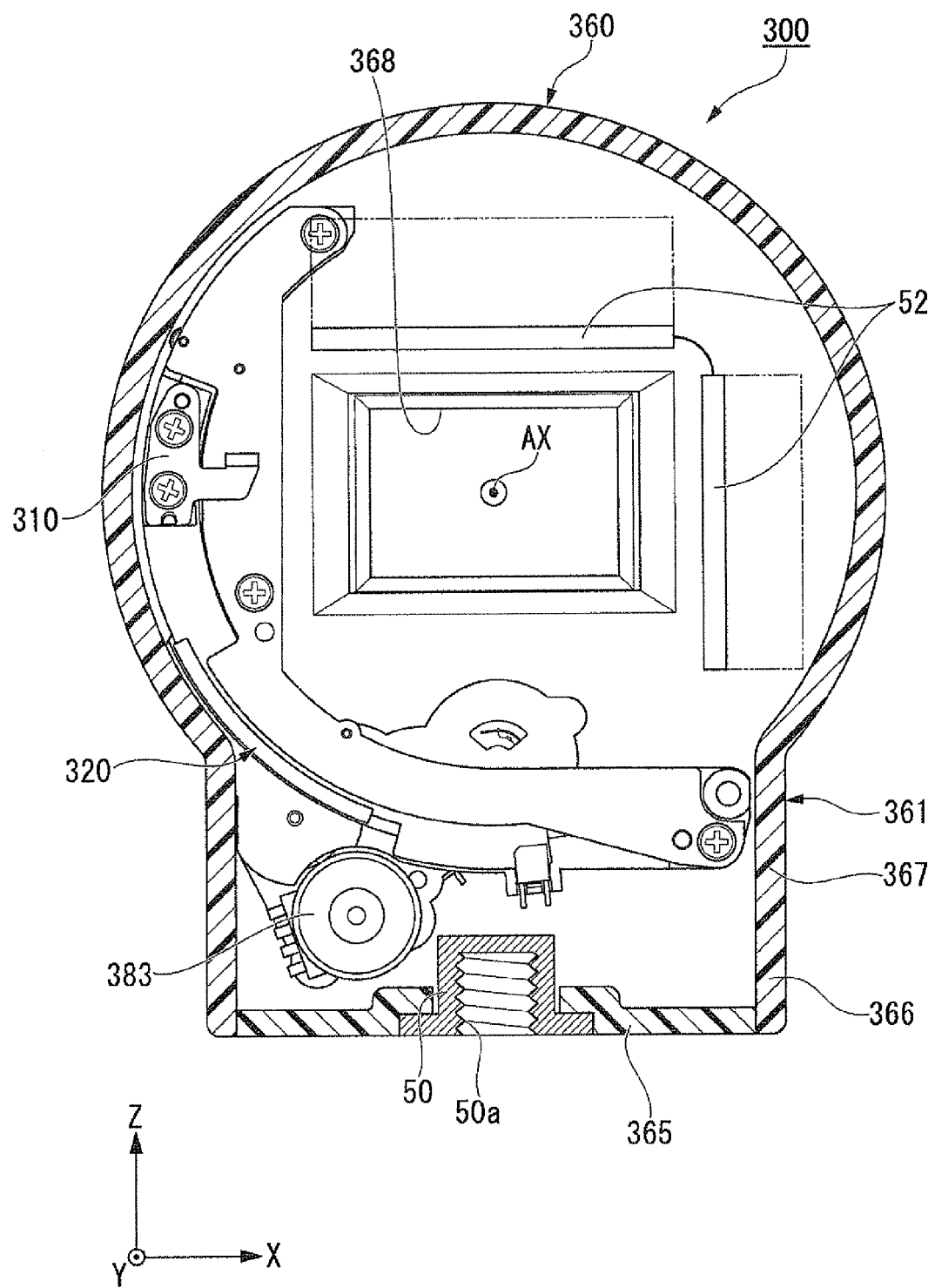
FIG. 11 is a cross-sectional view corresponding to a cross-section B-B of FIG. 10 of the adapter of the present embodiment.

FIG. 11 is a cross-sectional view corresponding to a cross-section B-B of FIG. 10 of the adapter 300 of the present embodiment.

As shown in FIG. 6, the movable member 310 of the present embodiment includes a main body portion 371, a first contact portion 372, a first gear portion 373, and a flange portion 374. The movable member 310 is rotated by a force (torque transmitted) which the first gear portion 373 (input portion) receives from the driving apparatus 320. Due to the fact that the first contact portion 372 (output portion) operates (transmits) a force with respect to the diaphragm-driving member 203 of the interchangeable lens 200 by the rotation of the movable member 310, the movable member 310 of the present embodiment displaces the diaphragm-driving member 203.

In the present embodiment, an external form of the main body portion 371 when viewed from the optical axis direction (Y-axis direction) is approximately the same as an external form of the movable member 310 when viewed from the optical axis direction. The shape of the main body portion 371 is approximately the same as the portion which occupies the predetermined angle range $\alpha[°]$ in the circumferential direction with the optical axis AX as the center in the ring with the optical axis AX as the center. The main body portion 371 of the present embodiment includes a first surface 375 which faces the +Y direction in the optical axis direction, a second surface 376 which faces the −Y direction, and a third surface 377A and a fourth surface 377B which connect an outer edge of the first surface 375 and an outer edge of the second surface 376. The movable member 310 of the present embodiment includes a first member 378 including the first surface 375 and a second member 379 including the second surface 376. In the present embodiment, the first member 378 and the second member 379 are each formed by molding a resin material or the like. In addition, the main body portion 371 may be not formed of the first member 378 and the second member 379, and may be integrally formed of a resin material.

The first contact portion 372 of the present embodiment is mounted on the first member 378 of the main body portion 371 in the same side (+Y side) as the second adapter side mount 362 with respect to the main body portion 371. The first contact portion 372 protrudes to the inside of the inner circumference of the second adapter side mount 362 when viewed from the +Y direction (when viewed in −Y direction) in the optical axis direction. The first contact portion 372 contacts the diaphragm-driving member 203 of the interchangeable lens 200 in the mounted state of the interchangeable lens 200. The diaphragm-driving member 203 of the interchangeable lens 200 is biased toward a predetermined direction (counterclockwise direction when viewed from +Y side) and is pressed to the first contact portion 372 by the biasing force in the mounted state of the interchangeable lens 200. The first contact portion 372 is integrally rotated with the main body portion 371 in the state of contacting the diaphragm-driving member 203, and therefore, the first contact portion displaces the diaphragm-driving member 203 in a predetermined direction in which the diaphragm-driving member 203 is biased.

The first gear portion 373 of the present embodiment is arranged in the vicinity of the driving apparatus 320. The first gear portion 373 of the present embodiment is arranged in an angle range which is equal to or more than −180° and less than −90° at the position (angle position) of the circumferential direction with the optical axis AX as the center. The first gear portion 373 of the present embodiment is mounted on the fourth surface 377B which faces the outside in the radial direction with the optical axis AX as the center in the main body portion 371. The first gear portion 373 includes a plurality of gear teeth which face the outside in the radial direction with the optical axis AX as the center. A center of a pitch circle 380 of the first gear portion 373 substantially coincides with the optical axis AX of the interchangeable lens 200. The plurality of gear teeth of the first gear portion 373 are arranged in a range corresponding to a portion of the circumferential direction of the pitch circle 380.

The flange portion 374 of the present embodiment is provided in substantially the same angle range as the first gear portion 373 in the circumferential direction with the optical axis AX as the center. The flange portion 374 is mounted on the second member 376 of the main body portion 371 in the same side (+Y direction) as the second adapter side mount 362 with respect to the main body portion 371. The flange portion 374 of the present embodiment protrudes further than the tips of the teeth of the first gear portion 373 toward the outside in the radial direction with the optical axis AX as the center from the main body portion 371.

As shown in FIG. 7, the driving apparatus 320 of the present embodiment includes a second gear portion (power transmission portion) 381, a second contact portion 382, an actuator 383, and an encoder 384.

The second gear portion 381 of the present embodiment outputs the power which is input from the actuator 383 to the first gear portion 373. The second gear portion 381 includes a plurality of gears. In the second gear portion 381, the gear teeth of a first gear 385 in the plurality of gears are meshed with the gear teeth of the first gear portion 373. The first gear 385 is arranged to the outside in the radial direction with the optical axis AX as the center in relation to the first gear portion 373. Moreover, the power transmission portion may transmit the power, which is output from the actuator 383, to the first gear portion 373 using friction or the like.

The second contact portion 382 of the present embodiment is annular. A shaft of the second contact portion 382 is connected to the rotation shaft of the first gear 385 so as to be coaxial with the rotation shaft of the first gear 385 of the second gear portion 381. The second contact portion 382 contacts the flange portion 374 of the first gear portion 373 and a gap between the first gear portion 373 and the first gear 385 of the second gear portion 381 is formed. That is, the sizes and the positions of the second contact portion 382 and the flange portion 374 in the radial direction with the optical axis AX as the center are set so that the first gear portion 373 and the first gear 385 of the second gear portion 381 contact each other in a state where the tips of the teeth of the first gear portion 373 do not reach the bases of the teeth of the first gear 385.

The actuator 383 of the present embodiment includes an electric motor (stepping motor). The actuator is connected to the second gear portion 381. The actuator 383 supplies torque to the second gear portion 381 and rotates the first gear 385 of the second gear portion 381. The second gear portion 381 will be described in detail below.

The encoder 384 of the present embodiment detects rotation information which indicates the rotation state of at least one gear in the plurality of gears of the second gear portion 381. The rotation state of the gear includes at least one of the rotating speed and the rotation position of the gear. The encoder 384 outputs the detected rotation information to the adapter control unit 350.

As shown in FIGS. 8 and 9, the adapter 300 of the present embodiment includes a sensor 386 which detects position information relating to the position of the movable member 310. The sensor 386 optically detects the information relating to the position of the movable member 310. The sensor 386 detects whether or not the movable member 310 is most rotated in a counterclockwise direction in the circumferential direction with the optical axis AX as the center. The sensor 386 outputs the detected position information to the adapter control unit 350.

The adapter control unit 350 controls the actuator 383 based on at least one of the items of rotation information which are output from the encoder 384 and the position information which is output from the sensor 386, and therefore, capable to control the rotation state of the first gear 385 of the second gear portion 381. The adapter control unit 350 controls the rotation position of the movable member 310 by controlling the rotation state of the first gear 385, and as a result, can control the displacement of the diaphragm-driving member 203.

As shown in FIGS. 6 and 8, the adapter 300 of the present embodiment includes a supporting roller 387 which supports the movable member 310 so that the movable member 310 is smoothly rotated in the circumferential direction with the optical axis AX as the center. In the present embodiment, the supporting roller 387 includes a first S supporting roller 387A, a second supporting roller 387B, and a third supporting roller 387C.

The first supporting roller 387A is arranged inside in the radial direction with the optical axis AX as the center with respect to the movable member 310. The first supporting roller 387A is arranged in a position which is closer to the first contact portion 372 than the second gear portion 381 in relation to the rotation position in the circumferential direction with the optical axis AX as the center. The first supporting roller 387A is arranged in the vicinity of the first contact portion 372 so that a virtual line which connects the optical axis AX and a center of the first supporting roller 387A when viewed from the optical axis direction (Y-axis direction) crosses the movable range of the first contact portion 372. The third supporting roller 387C is arranged outside in the radial direction with the optical axis AX as the center with respect to the movable member 310. The third supporting roller 387C is arranged so as to insert the movable member 310 between the first supporting roller 387A and the third supporting roller 387C.

The second supporting roller 3878 is arranged inside in the radial direction with the optical axis AX as the center with respect to the movable member 310. The second supporting roller 387B is arranged in a position which is closer to the first gear portion 373 than the first supporting roller 387A. The second supporting roller 387B is arranged in the vicinity of the first gear portion 373 so that a virtual line, which connects the optical axis AX and a center of the second supporting roller 387B when viewed from the optical axis direction (Y-axis direction), crosses the first gear portion 373. The second supporting roller 387B is arranged so as to insert the first gear portion 373 of the movable member 310 between the second gear portion 381 and the second supporting roller 387B.

The adapter 300 of the present embodiment includes a holding member 392 shown in FIG. 8 and a pressing plate 393 shown in FIG. 9. The holding member 392 is fixed to the first housing member 360. The holding member 392 is opposite to the pressing plate 393 in the optical axis direction (Y-axis direction). The first supporting roller 387A, the second supporting roller 387B, the third supporting roller 387C, and the movable member 310 are arranged between the holding member 392 and the pressing plate 393 in the optical axis direction. One end of the rotation shaft of each of the first supporting roller 387A, the second supporting roller 387B, and the third supporting roller 387C is rotatably supported by the holding member 392, and the other end of each rotation shaft is rotatably supported by the pressing plate 393.

The movable member 310 is inserted between the holding member 392 and the pressing plate 393 while having a gap so as not to inhibit the rotation in the circumferential direction with the optical axis AX as the center between the holding member 392 and the pressing plate 393. The movable member 310 is inserted between the holding member 392 and the pressing plate 393, and therefore, the movement of the movable member 310 is regulated in the optical axis direction (Y-axis direction).

However, in the adapter 300, when the movable member is provided throughout the entire circumference in the circumferential direction with the optical axis of the interchangeable lens 200 as the center, the power of the driving apparatus which is required for rotating the movable member is increased, and there is a possibility that the size of the adapter is larger. Moreover, in the adapter, when the movable member is provided throughout the entire circumference in the circumferential direction with the optical axis of the interchangeable lens 200 as the center, the mechanism which supports the movable member is more complicated, and there is a possibility that the size of the adapter needs to be larger.

In the adapter 300 of the present embodiment, since the movable member 310 is provided on a portion in the circumferential direction with the optical axis AX of the interchangeable lens 200 as the center, the weight of the movable member 310 can be kept to a minimum. Therefore, in the adapter 300, the power of the driving apparatus 320 which is required for rotating the movable member 310 can be decreased, and the size of the apparatus can be made smaller. Moreover, in the adapter 300, since the movable member 310 is provided on a portion in the circumferential direction of the optical axis AX of the interchangeable lens 200, the mechanism which supports the movable member 310 can be simple, and the size of the apparatus can be made smaller.

In the present embodiment, the pin 363 is arranged at a position in which the distance L3, which is a distance between the pin 363 and the optical axis AX, is substantially the same as the distance L1, which is a distance between the optical axis AX and the movable member 310, in relation to the radial direction with respect to the optical axis AX in the second range A2 outside the first range A1 in relation to the circumferential direction of the optical axis AX. Therefore, in the adapter 300, the size of the adapter 300 in the radial direction with respect to the optical axis AX can be made smaller while interference (collision) between the movable member 310 and the pin 363 is suppressed, and the size of the apparatus can be made smaller.

In the present embodiment, the second terminal portion 330 is arranged at a position in which the distance L2, which is a distance between the second terminal 330 and the optical axis AX, is substantially the same as the distance L1, which is a distance between the optical axis AX and the movable member 310, in relation to the radial direction with the optical axis Ax as the center in the second range A2 except for the first range A1 with respect to the circumferential direction with the optical axis AX as the center. Therefore, in the adapter 300, the size of the adapter 300 in the radial direction with the optical axis AX as the center can be made smaller while interference (collision) between the movable member 310 and the second terminal portion 330 is suppressed, and the size of the apparatus can be made smaller.

However, depending on the extent to which the movable member interferes with the holding member or the pressing plate according to the rotation, an error of the size in the optical axis direction may be generated. Moreover, in the adapter, in a case where the movable member is annular, there is a concern that the rotation of the movable member may be obstructed by a distortion in the shape of the movable member due to a manufacturing error or the like.

In the adapter 300 of the present embodiment, since the movable member 310 is provided on a portion of the circumferential direction of the optical axis AX of the interchangeable lens 200, it is possible to prevent the rotation of the movable member 310 from being obstructed due to a manufacturing error of the movable member 310 or the like.

Incidentally, the adapter 300 of the present embodiment includes a structure for fixing and installing a tripod or the like to an installation base for photographing at the time of photographing. Hereafter, the present embodiment will be described using a tripod 51 (see FIG. 10) as an example of an installation base for photographing.

Figure 12:
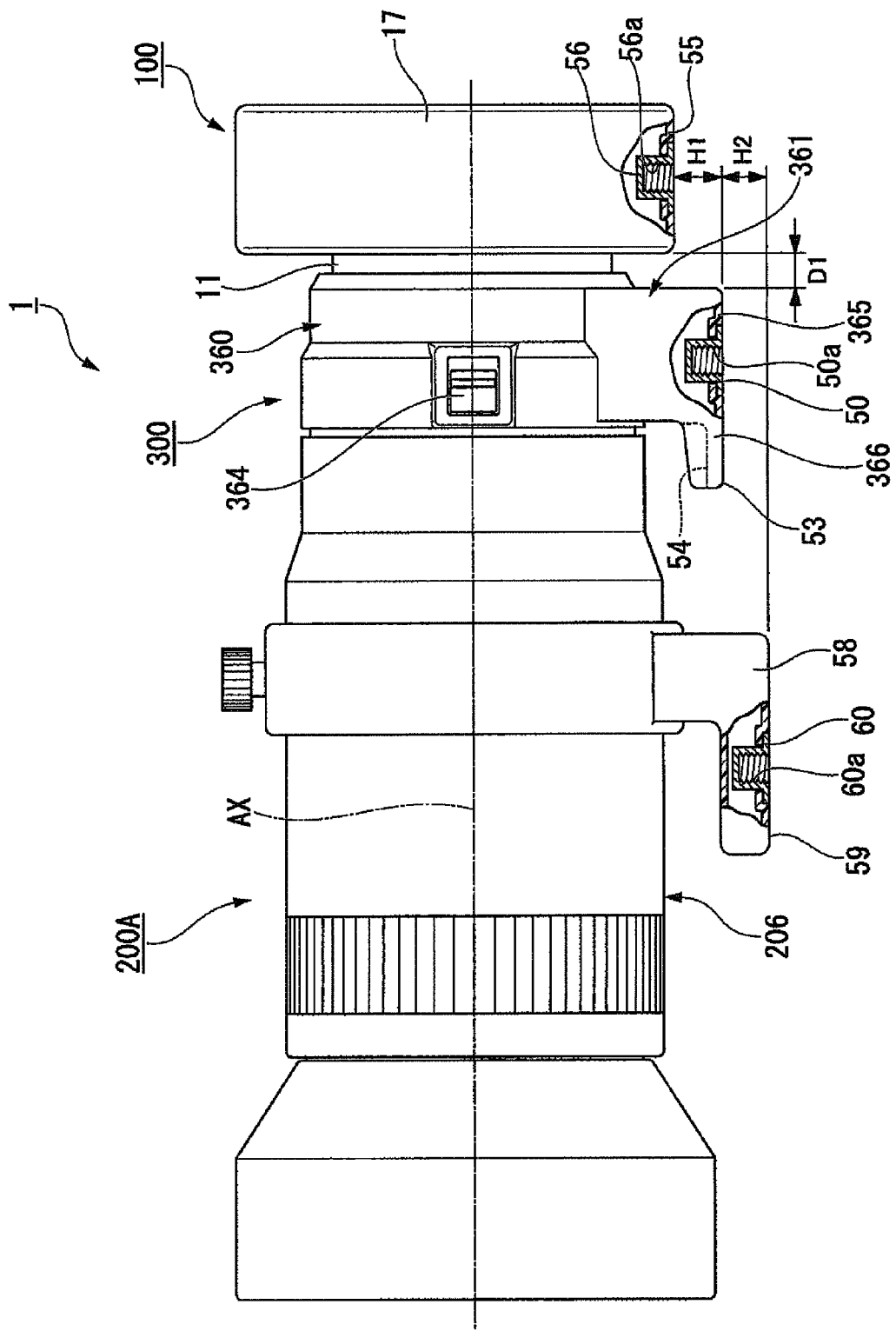
FIG. 12 is a side view in which a mounting seat portion of the camera system of the present embodiment is broken.

FIG. 10 is a side view in which a portion of the adapter 300 is transparently shown. FIG. 11 is a cross-sectional view of the adapter 300 when viewed from the direction of the optical axis AX. FIG. 12 is a side view in which a portion of the camera body 100, the adapter 300, and the interchangeable lens 200A which are mounted are transparently shown.

As shown in FIGS. 10 to 12, in approximately the center of a lower surface 365 of a bottom portion 366 in the second housing member 361 (second housing portion) which protrude downward from the above-described first housing member 360 (first housing portion) and is integrally formed, a screw hole 50a for fixing a tripod is provided. A screw for fixing (not shown) which protrudes upward from a bearing surface 51a of the tripod 51 is tightened to the screw hole 50a. The screw hole 50a is configured by a screw-receiving part 50 which is fixed to a bottom wall of the bottom portion 366. In addition, in the adapter 300 of the present embodiment, the screw-receiving part 50 becomes a mounting seat of the adapter 300 (adapter side mounting seat) with respect to the tripod 51.

As shown in FIG. 11, the inner portion of the second housing member 361 which protrudes downward from the first housing member 360 is formed in a hollow shape. Moreover, in the inner portion of the hollow shape, at least a portion of the driving apparatus 320 such as the actuator 383 is disposed. The driving apparatus 320 is arranged further to the outside than the installation position of the screw-receiving part 50 which is arranged in substantially the center (or in the vicinity of the center) of the bottom portion of the second housing member 361 (is arranged in the peripheral position of the installation position of the screw hole 50a so as to avoid the screw hole 50a). In this way, since the part is arranged in the second housing member 361, a dead space is not created, the part can be effectively arranged, and the miniaturization of the apparatus can be improved. Moreover, reference numeral 52 shown in FIG. 11 indicates a circuit substrate which is installed in the first housing member 360.

In addition, as shown in FIGS. 3 and 4, the bottom portion 366 of the second housing member 361 includes a thick extended wall (protruding portion) 53 which protrudes on a side to which the interchangeable lens 200 is attached and detached in the direction of the optical axis AX (hereinafter, referred to as a "front side") with respect to the ceiling portion 367. The tip side of the extended wall 53 protrudes further to the front side than the end surface of the front side of the first housing member 360. A portion of the upper surface of the extended wall 53 is notched. In the present embodiment, the notched portion is formed in an arc-shaped groove (recessed portion) 54 in which a constant arc shape with the optical axis AX as the center is notched.

On the other hand, as shown in FIG. 12, a screw hole 56a, to which a screw (not shown) that protrudes from the bearing surface 51a (refer to FIG. 10) of the tripod 51 is tightened, is provided on a center portion of a lower surface 55 of the camera body 100. Similar to the screw hole 50a of the adapter 300, the screw hole 56a is configured by a screw-receiving part 56 which is fixed to the bottom wall of the camera body 100. In the present embodiment, the lower surface 55 of the camera body 100 becomes a mounting seat of the camera body 100 (camera body side mounting seat) with respect to the tripod 51.

In the state where the adapter 300 is connected to the camera body 100, when the camera body 100 is held in a positive position photographing state (lateral position photographing state), as shown in FIG. 12, heights of the lower surface 365 of the adapter 300 and the lower surface of the screw-receiving part 50 (adapter side mounting seat) are set to so as to be lower by a predetermined dimension H1 than the height of the lower surface 55 of the camera body 100. In the state where the adapter 300 is connected to the camera body 100, when the lower surface 365 of the adapter 300 is fixed to the bearing surface 51a of the tripod 51, the dimension H1 is set to a dimension in which the bearing surface 51a of the tripod 51 does not interfere with the lower surface 55 of the camera body 100.

Moreover, the second housing member (second housing portion) 361 of the adapter 300 is formed so as to shift in the front side (left side in FIG. 12; near to the mounting portion of the interchangeable lens) with respect to the end surface of the camera body 100 of the first housing member (first housing portion) 360 (in other words, in each opposing surface which is included in both housing portions opposing the camera body 100, the opposing surface of the second housing portion is arranged and formed so as to be further separated from the camera body 100 side than the opposed surface (first surface) of the first housing portion). Specifically, when the adapter 300 is connected to the camera body 100, the second housing member 361 is formed so as to shift in the front side with respect to the end surface of the camera body 100 side of the first housing member 360 enough to generate a predetermined gap D1 in the direction of the optical axis AX between the adapter 300 and the camera body 100. In this way, according to the structure in which the second housing member 361 is slightly (enough to generate the gap D1) shifted to the front side, when the adapter 300 is attached to and detached from the camera body 100, the adapter 300 cannot interfere with the camera body 100. This is described with reference to FIG. 13.

Figure 13:
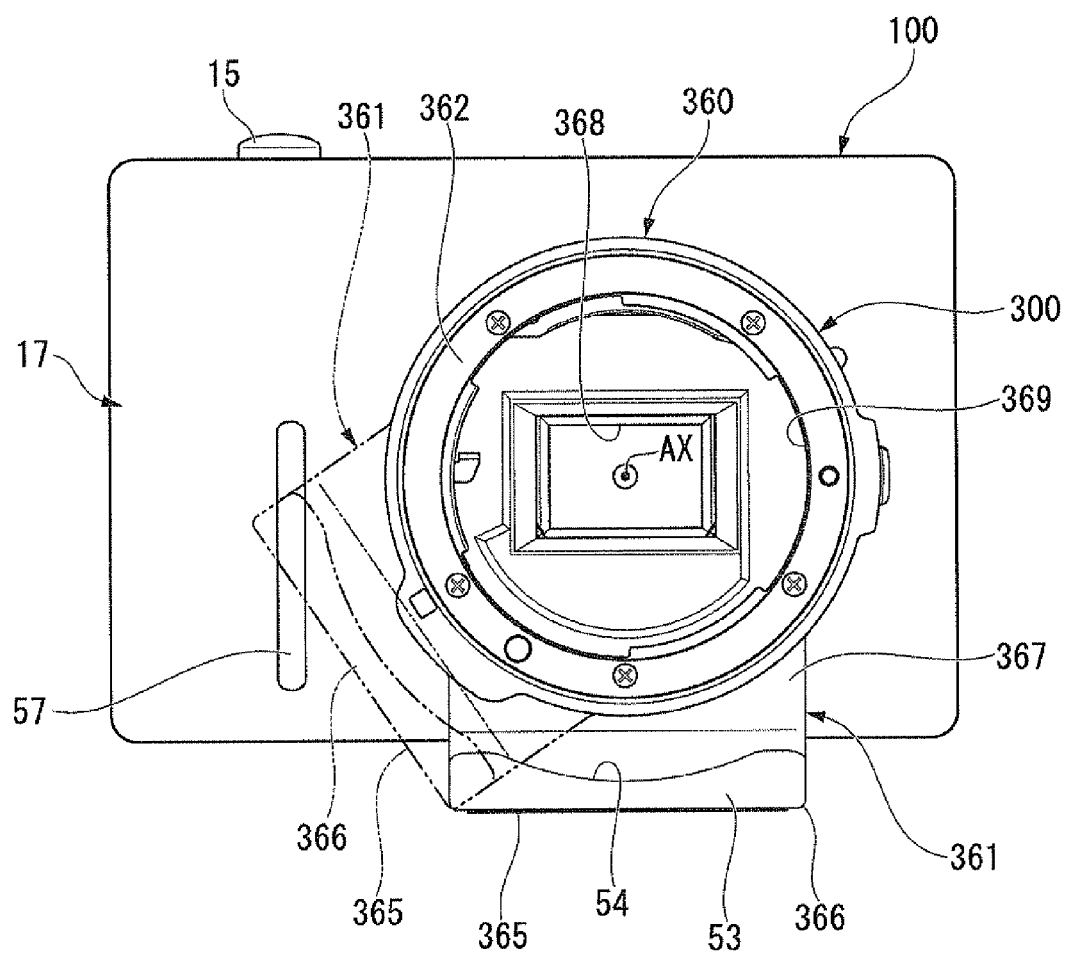
FIG. 13 is a front view showing the adapter and the camera body of the present embodiment.

FIG. 13 is a front view showing a state where the adapter 300 is rotated around the optical axis AX with respect to the camera body 100 and is attached to and detached from the camera body by a virtual line.

On the front surface (the surface on which the mount is provided) of the camera body 100, parts (for example, a convex portion 57 for grasping (for hooking a finger), operation buttons (not shown), or the like) that protrude from the front surface may be provided. In a rear surface of the adapter 300 (a surface of the second housing member 361 of the adapter 300 which is opposite to the front surface of the camera body 100 when the adapter 300 and the camera body 100 are attached to and detached from each other), when the adapter 300 is mounted on or removed from the mount portion of the camera body 100, as shown by a dotted line in FIG. 13, the adapter 300 is rotated with respect to the camera body 100. As described above, the second housing member 361 is formed so as to further protrude to the front side (the mounted surface side of the interchangeable lens) than the first housing member 360 enough to create the above-described gap D1, and therefore, at the time of the rotation of the mounting and detaching, the rear surface of the second housing member 361 can be attached and detached without interference with the protruding parts (for example, convex portion 57 for grasping) on the front surface of the camera body 100.

Here, in addition to the interchangeable lens 200 without the bearing surface for mounting the tripod as shown in FIG. 1, the interchangeable lens 200A including the bearing surface for mounting the tripod as shown in FIG. 12 can be mounted on the second adapter side mount 362 of the adapter 300. In the interchangeable lens 200A shown in FIG. 12, a bracket 58 which protrudes vertically downward to the outer circumferential surface of the lens barrel 206 and has an approximately L-shaped cross-section mounted, and a lower surface 59 of the extended portion of the bracket 58 becomes the bearing surface for mounting the tripod. In the center portion of the lower surface 59 of the bracket 58, a screw hole 60a, to which a screw (not shown) that protrudes from the bearing surface 51a of the tripod 51 is tightened, is provided. Similar to the screw hole 50a of the adapter 300, the screw hole 60a is configured by a screw-receiving part 60 which is fixed to the bottom wall of the bracket 58. In the present embodiment, the lower surface 59 of the bracket 58 becomes a mounting seat of the interchangeable lens 200A (interchangeable lens side mounting seat) with respect to the tripod 51.

As shown in FIG. 12, in a state where the interchangeable lens 200A is connected to the adapter 300, the height of the lower surface 365 of the adapter 300 is set so as to be higher as a predetermined dimension H2 than the height of the lower surface 58a of the bracket 58 of the interchangeable lens 200A. In a state where the interchangeable lens 200A is connected to one end of the first housing member 360 of the adapter 300 and the other end of the second housing member 361 is connected to the camera body 100, when the lower surface 59 of the bracket 58 is fixed to the bearing surface 51a of the tripod 51, the dimension H2 is set to a dimension in which the bearing surface 51a of the tripod 51 does not interfere with the lower surface 365 of the second housing member 361 of the adapter 300.

Figure 14:
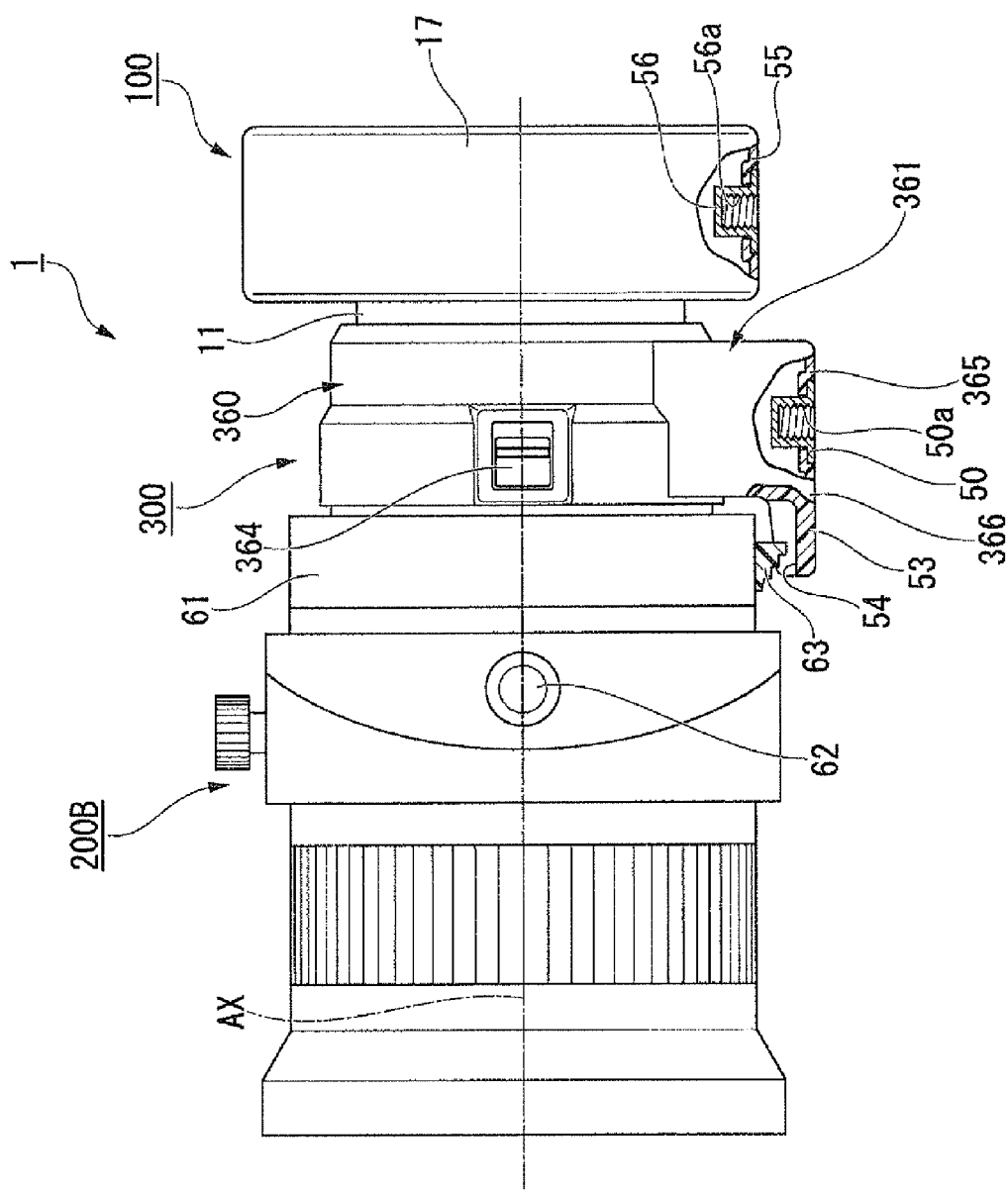
FIG. 14 is a side view in which the mounting seat portion of the camera system of the present embodiment is broken.
Figure 15:
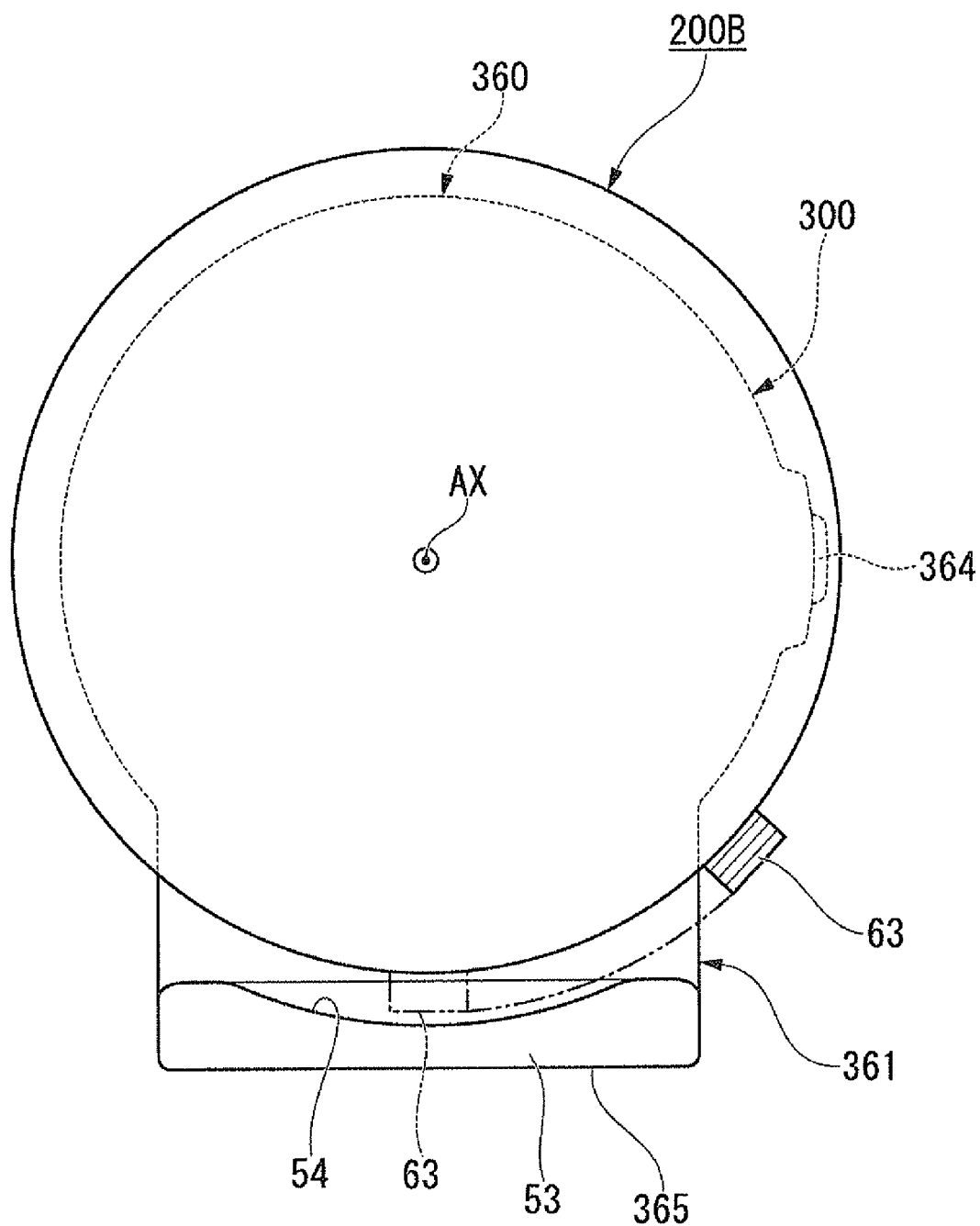
FIG. 15 is a front view showing the camera system of the present embodiment.

FIGS. 14 and 15 are a side view and a front view of the camera system 1 of the present embodiment when an interchangeable lens 200B for shift and tilt photographing is connected to the adapter 300.

The interchangeable lens 200B includes a mount portion 61, which can be attached to and be detached from the adapter 300, in the end in the direction of the optical axis AX of the adapter connection. A rotation mechanism 62 for tilt photographing is provided further to the front side (left side in FIG. 14; subject side) than the mount portion 61. An operating lever 63 for performing a locking operation and an unlocking operation of the rotation mechanism 62 is provided so as to protrude to the outer circumferential portion of the mount portion 61 (downward the outer circumferential portion). When the interchangeable lens 200B is mounted on the adapter 300, the operating lever 63 protrudes to a position in which a portion of the operating lever overlaps with the extended wall (protruding portion) 53 of the second housing member 361 of the adapter 300 when viewed from the side. However, since the arc-shaped groove (recess portion) 54 is provided at the side facing the second adapter side mount 362 on the upper surface of the extended wall 53 as described above (refer to FIGS. 3 and 4), the operating lever 63 does not interfere with the extended wall 53. That is, the arc forming the inner surface of the arc-shaped groove 54 is set so as to be arranged further to the outside in the radial direction than a rotation trajectory of the tip of the operating lever 63 around the optical axis AX (refer to FIG. 15).

Moreover, when the interchangeable lens 200 (200A or 200B) is not mounted, a cover cap (not shown) may be mounted on the end surface of the front side of the first housing member 360 of the adapter 300. However, when the cover cap is attached and detached, the arc-shaped groove 54 on the extended wall 53 also has a function of preventing a user's fingertip from interfering with the upper surface of the extended wall 53 and for preventing inhibition of the operation.

Figure 16:
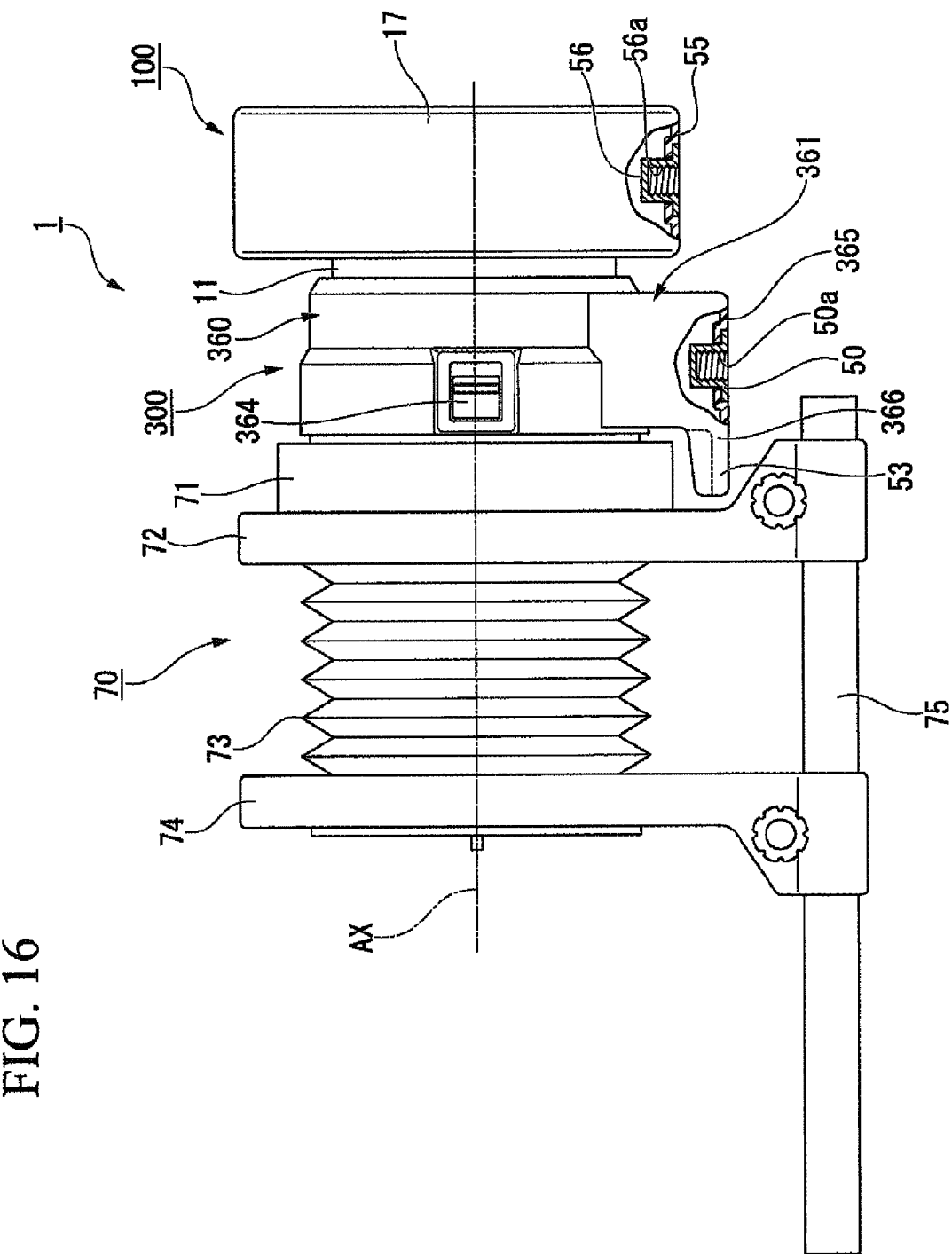
FIG. 16 is a side view in which the mounting seat portion of the camera system of the present embodiment is broken.

FIG. 16 is a side view of the camera system 1 of the present embodiment when a bellows attachment 70 for close-up photographing is connected to the adapter 300. Moreover, the lens for close-up photographing which is mounted on the bellows attachment 70 is not shown in FIG. 16.

The bellows attachment 70 includes a mount portion 71 which can be attached to and detached from the adapter 300, a rear support frame 72 which is connected to the mount portion 71, a front support frame 74 which is arranged in the front side of the rear support frame 72 while interposing a bellows 73, and a guide frame 75 which is connected to the rear support frame 72 and slidably supports the front support frame 74. The interchangeable lens for close-up photographing (not shown) is mounted on the front support frame 74 side.

As described above, the extended wall 53 is provided on the bottom portion 366 of the second housing member 361 of the adapter 300, and the end of the extended wall 53 further protrudes to the front side than the end surface of the first housing member 360. However, the protrusion amount of the extended wall 53 from the first housing member 360 is set to a dimension in which the extended wall does not interfere with the rear support frame 72 of the bellows attachment 70 when the bellows attachment 70 is connected to the adapter 300. Moreover, as shown in FIG. 16, the height of the lower surface 365 of the adapter 300 is also set to a dimension in which the lower surface does not interfere with the rear support frame 72 of the bellows attachment 70 or the guide frame 75.

As described above, in the adapter 300 of the present embodiment, at least a portion of the driving apparatus 320 such as the actuator 383 which is an electric part is arranged in the second housing member (second housing portion) 361 side which protrudes downward from the first housing member (first housing portion) 360. In addition, since a portion of the driving apparatus 320 (actuator 383 or the like) is arranged further to the outside (in the periphery) than the screw-receiving part 50 which is arranged in the vicinity of the center of the bottom portion of the second housing member 361, the part disposition in the second housing member 361 can be effectively performed, and the size of the apparatus can be made smaller.

Moreover, in the adapter 300 of the present embodiment, the lower surface 365 which is mounted on the tripod 51 is set so as to be lower (so as to be the outside in relation to the radial direction with the optical axis AX as the center) by the predetermined dimension H1 than the lower surface 55 (camera body side mounting seat) of the camera body 100. Therefore, as shown in FIG. 1, when the interchangeable lens 200 without a seat for mounting the tripod 51 is connected and used, a interference between the camera body 100 and the tripod is not generated, and the lower surface 365 of the adapter 300 can be securely fixed to the bearing surface 51a of the tripod 51. Therefore, in the camera system 1 which uses the adapter 300, even though the distance from the camera body 100 to the center of gravity of the interchangeable lens 200 is longer than the shaft length of the adapter 300, improved balance of the tripod 51 can be maintained by fixing the bearing surface 51a of the tripod 51 to the adapter 300.

Moreover, the adapter 300 (adapter main body) of the present embodiment includes the cylindrical first housing member 360 which can be attached to and detached from the camera body 100 and the interchangeable lens 200 (200A or 200B) and the second housing member 361 which protrudes to the outside in the radial direction from the first housing member 360, and the adapter side mounting seat for mounting the tripod is set to the lower surface 365 (end) of the second housing member 361. Therefore, the adapter side mounting seat for mounting the tripod can be set to an appropriate height without expanding the entire circumference region of the first housing member 360. Thereby, the degree to which the adapter 300 can be made to be compact can be improved.

In addition, in the adapter 300 of the present embodiment, a portion of the driving apparatus 320 such as the actuator 383 which is a heavy load is arranged in the inner portion of the second housing member 361 which protrudes vertically downward from the first housing member 360. Therefore, the balance of the camera system 1, particularly, the balance of the camera system 1 when the adapter 300 is installed so as to be fixed to the tripod 51 can be satisfactorily maintained.

Moreover, in the adapter 300 of the present embodiment, the lower surface 365 which is mounted on the tripod 51 is set so as to be higher (so as to be the inside in relation to the radial direction with the optical axis AX as the center) by the predetermined dimension H2 than the lower surface 59 (lens side mounting seat) of the bracket 58 of the interchangeable lens 200A. Therefore, when the interchangeable lens 200A including the seat for mounting the tripod is connected and used as shown in FIG. 12, interference between the tripod 51 and the adapter 300 or the camera body 100 is not generated and the bracket 58 of the interchangeable lens 200A can be securely fixed to the bearing surface 51a of the tripod 51.

Figure 17:
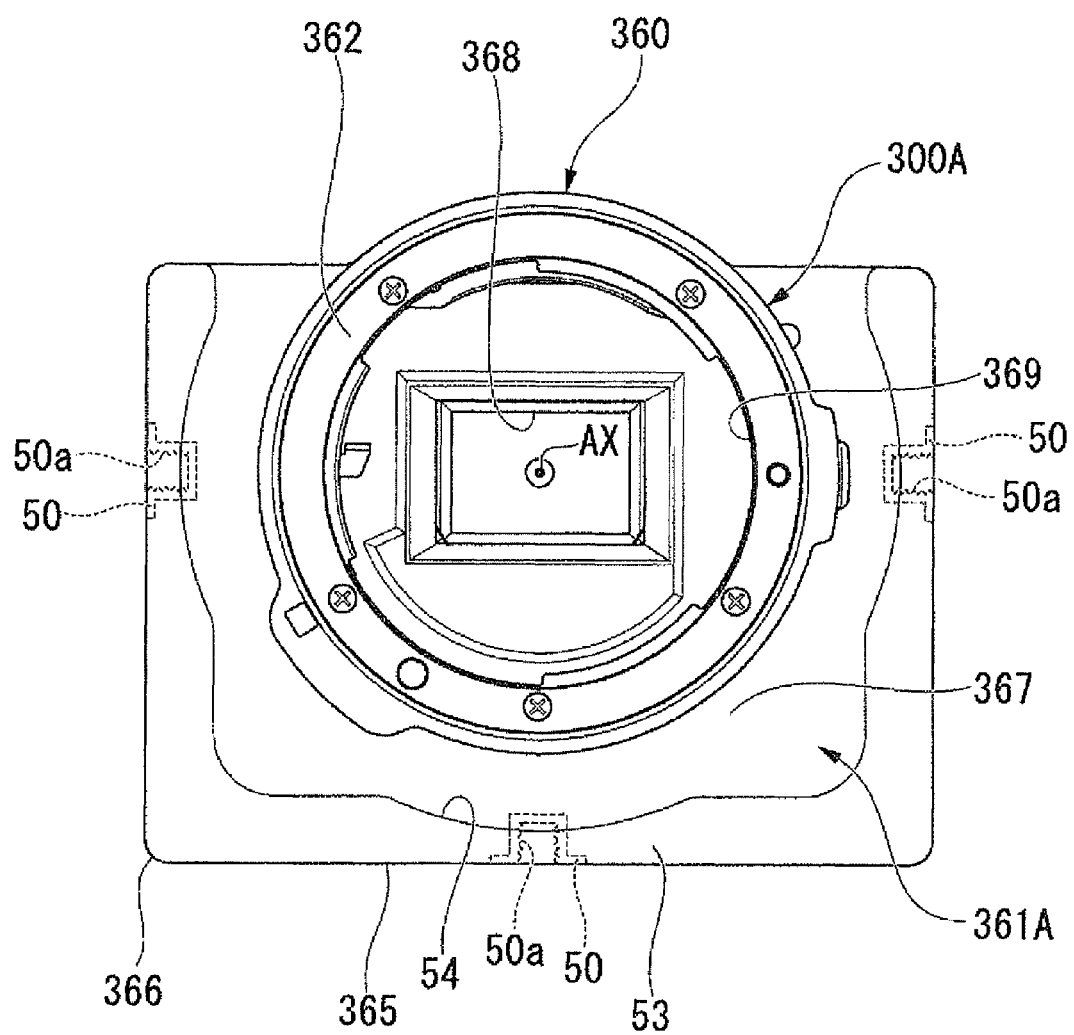
FIG. 17 is a front view showing another adapter of the present embodiment.

Moreover, the technical range of the present invention is not limited to the above-described embodiment. For example, in the adapter 300 of the above-described embodiment, the box-shaped second housing portion 361 is provided so as to be expanded to one side of the outside in the radial direction in the outer circumference of the cylindrical first housing member 360. However, like an adapter 300A shown in FIG. 17, a box-shaped second housing member 361A may be provided so as to be expanded on three sides in the outer circumference of the cylindrical first housing member 360.

Figure 18:
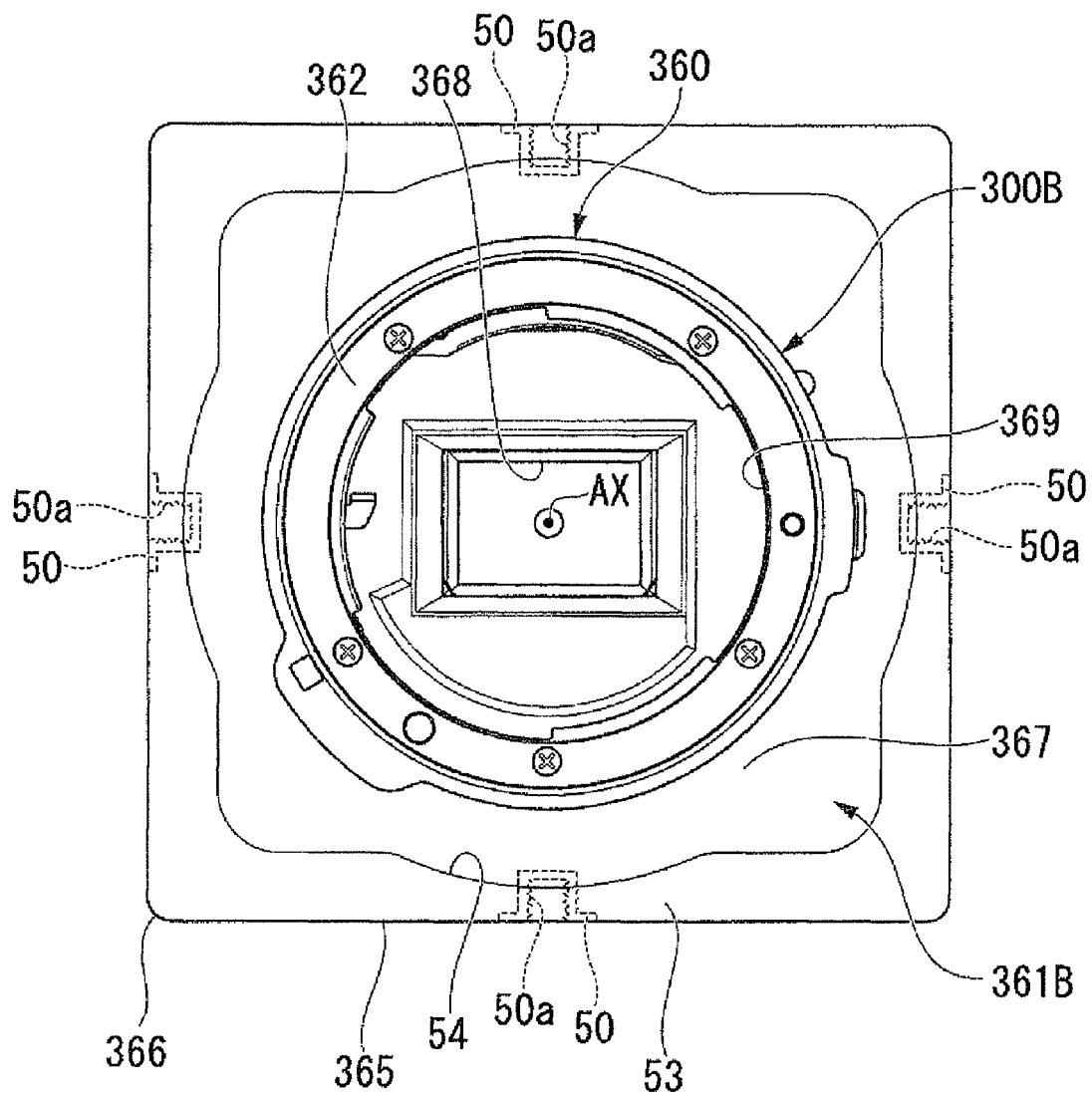
FIG. 18 is a front view showing still another adapter of the present embodiment.

Moreover, in the same manner as an adapter 300B shown in FIG. 18, a box-shaped second housing member 361B may be provided so as to be expanded on four sides in the outer circumference of the cylindrical first housing member 360. In the case of the examples, each protruding end of the second housing members 361A and 361B is flatly formed and the screw-receiving part 50 including the screw hole 50a for mounting the tripod is mounted on each end surface.

At least one of the requirements described in the embodiments may be omitted. Each requirement described in the embodiments may be appropriately combined.

What is claimed is:

1. An adapter comprising:
    a first housing portion that comprises a first mount portion which a camera body can be attached to and detached from via a camera body mount, and a second mount portion which is provided so as to be separated from the first mount portion and which an interchangeable lens can be attached to and detached from via an interchangeable lens mount which has a different size from that of the camera body mount;
    a second housing portion that is integrally formed with the first housing portion;
    an adapter side mounting seat, which is arranged at the second housing portion and which can be attached to and detached from an installation base for photographing;
    wherein the first mount portion is provided at a first surface side of the first housing portion,
    wherein the second housing portion comprises a protruding portion which protrudes outwardly beyond an end surface of the first housing portion, the end surface of the first housing portion being at a side of the first housing portion facing in a direction opposite to the first surface side of the first housing portion, and
    wherein the adapter side mounting seat is arranged further on an inside than a lens side mounting seat in relation to a radial direction with an optical axis of the interchangeable lens as a center when the interchangeable lens is mounted on the second mount portion, the interchangeable lens comprising the lens side mounting seat which can be attached to and detached from the installation base for photographing.

2. The adapter according to claim 1,
    wherein the adapter side mounting seat is arranged further on an outside than a camera body side mounting seat in relation to the radial direction with the optical axis of the interchangeable lens as the center when the camera body is mounted on the first mount portion, the camera body comprising the camera body side mounting seat which can be attached to and detached from the installation base for photographing.

3. The adapter according to claim 1, further comprising;
    a driven member, and
    a drive system that drives the driven member,
    wherein the second housing portion comprises the adapter side mounting seat on an opposite side of the first housing portion,
    wherein the adapter side mounting seat is arranged in a vicinity of a center of the second housing portion at the opposite side, and
    wherein, in an inside of the second housing portion, at least a portion of the drive system is arranged in a periphery of the adapter side mounting seat.

4. The adapter according to claim 1,
    wherein a surface of the second housing portion on the first surface side is arranged at a position which is more separated from the camera body mounted on the first mount portion than the first surface.

5. The adapter according to claim 1,
    wherein a recess portion of the protruding portion is formed at a side where the second mount portion faces.

6. The adapter according to claim 3,
    wherein the drive system is a driving apparatus that drives a diaphragm of the interchangeable lens mounted on the second mount portion.

7. A camera system comprising:
    the adapter according to claim 1;
    a camera body that is mounted on the first mount portion; and
    an interchangeable lens that is mounted on the second mount portion.

* * * * *